(12) United States Patent
Xu

(10) Patent No.: US 11,172,520 B2
(45) Date of Patent: Nov. 9, 2021

(54) CONNECTION METHOD AND DEVICE

(71) Applicant: SHANGHAI SHANGWANG NETWORK TECHNOLOGY CO., LTD., Shanghai (CN)

(72) Inventor: Changhua Xu, Shanghai (CN)

(73) Assignee: SHANGHAI SHANGWANG NETWORK TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/693,418

(22) Filed: Nov. 25, 2019

(65) Prior Publication Data

US 2020/0100302 A1  Mar. 26, 2020

Related U.S. Application Data

(63) Continuation of application No. PCT/CN2018/087231, filed on May 17, 2018.

(30) Foreign Application Priority Data

May 24, 2017  (CN) .......................... 201710375547.3

(51) Int. Cl.
*H04W 76/10* (2018.01)
*H04W 12/06* (2021.01)
(Continued)

(52) U.S. Cl.
CPC ........... *H04W 76/10* (2018.02); *H04W 12/06* (2013.01); *H04W 48/14* (2013.01); *H04W 48/16* (2013.01);
(Continued)

(58) Field of Classification Search
CPC ....... H04W 84/12; H04W 88/08; H04W 4/80; H04W 48/16; H04W 12/06; H04W 24/10;
(Continued)

(56) References Cited

U.S. PATENT DOCUMENTS

| | | | |
|---|---|---|---|
| 9,609,484 B1* | 3/2017 | Rodoper | G01S 5/0284 |
| 2012/0238287 A1* | 9/2012 | Scherzer | H04W 72/0406 |
| | | | 455/456.1 |

(Continued)

FOREIGN PATENT DOCUMENTS

| | | | |
|---|---|---|---|
| CN | 104244032 B | * | 3/2016 |
| CN | 105392178 A | | 3/2016 |

(Continued)

*Primary Examiner* — Daniel Lai
(74) *Attorney, Agent, or Firm* — Bayramoglu Law Offices LLC

(57) ABSTRACT

A connection establishing method and device, including: a wireless access point with tag information and push information to-be-displayed corresponding to the wireless access point are obtained at a user equipment side, the preferred wireless access point being selected by a network device from wireless access point(s) scanned by a user equipment according to received attribute information of wireless access points; when the user equipment is to establish a connection to the preferred wireless access point, the preferred wireless access point is selected based on the tag information, a request for establishing a connection to the target wireless access point is sent to the network device, and the corresponding push information to-be-displayed is displayed, so that the corresponding push information to-be-displayed is displayed during establishment of a connection between the user equipment and the target wireless access point.

18 Claims, 9 Drawing Sheets

(51) Int. Cl.
   *H04W 48/14*    (2009.01)
   *H04W 48/16*    (2009.01)
   *H04W 48/20*    (2009.01)
   *H04W 80/12*    (2009.01)
   *H04W 84/12*    (2009.01)

(52) U.S. Cl.
   CPC ............ *H04W 48/20* (2013.01); *H04W 80/12* (2013.01); *H04W 84/12* (2013.01)

(58) Field of Classification Search
   CPC ..... H04W 48/20; H04W 8/005; H04W 24/02; H04W 24/04; H04W 48/10; H04W 12/08; H04W 40/246; H04W 48/18; H04W 4/23; H04W 48/00; H04W 88/085; H04W 76/10; H04W 48/14; H04W 80/12; H04W 48/12; H04W 4/02; H04W 48/08; H04B 17/318
   See application file for complete search history.

(56) References Cited

U.S. PATENT DOCUMENTS

| | | | |
|---|---|---|---|
| 2014/0079044 A1 | 3/2014 | Ding et al. | |
| 2014/0194153 A1* | 7/2014 | Salkintzis | H04W 4/12 455/466 |
| 2015/0133154 A1* | 5/2015 | Do | G01S 5/0236 455/456.1 |
| 2016/0054875 A1* | 2/2016 | Zhou | G06F 3/0483 715/776 |
| 2016/0165644 A1* | 6/2016 | Yang | H04W 4/12 370/328 |
| 2016/0226705 A1* | 8/2016 | Toner | H04L 41/0893 |
| 2020/0236737 A1* | 7/2020 | Ye | H04W 12/06 |

FOREIGN PATENT DOCUMENTS

| | | |
|---|---|---|
| CN | 105792119 A | 7/2016 |
| CN | 106211273 A | 12/2016 |
| CN | 106488529 A | 3/2017 |

* cited by examiner

CONNECTION METHOD AND DEVICE

CROSS REFERENCE TO THE RELATED APPLICATIONS

This application is continuation application of International Application No. PCT/CN2018/087231, filed on May 17, 2018, which is based upon and claims priority to Chinese Patent Application No. 201710375547.3, filed on May 24, 2017, the entire contents of which are incorporated herein by reference.

TECHNICAL FIELD

The present application relates to the computer field, and in particular, to a connection establishing method and device.

BACKGROUND

In the prior art, when a user equipment needs to establish a connection to a scanned wireless access point, the user equipment needs to attempt to establish a connection to a plurality of wireless access points one by one until a connection is successfully established. However, in such a connecting manner, user attempt has a high error rate and connecting efficiency is low. In addition, during establishment of a Wi-Fi (wireless network protocols) connection between the user equipment and the wireless access point, on an interface of the user equipment, traditional default connection animation accompanied with a text that notifies a user of a status of a connection process is displayed, causing the user to keep waiting during establishment of a connection. Consequently, user experience is poor.

SUMMARY

The present application is intended to provide a connection establishing method and device, to relieve a low success rate of connection and poor user experience during establishment of a Wi-Fi connection in the prior art.

According to an aspect of the present application, a connection establishing method at a user equipment side is provided, including:

obtaining a wireless access point with tag information and push information to-be-displayed corresponding to the wireless access point, where the wireless access point with tag information is selected by a network device from wireless access point(s) scanned by a user equipment according to received attribute information of wireless access points;

selecting a target wireless access point from the wireless access points based on the tag information; and sending, to the network device, a request for establishing a connection to the target wireless access point, and displaying the corresponding push information to-be-displayed.

Further, after the sending, to the network device, a request for establishing a connection to the target wireless access point, and displaying the corresponding push information to-be-displayed the method further includes:

receiving a connection control to the target wireless access point returned by the network device based on the request for establishing a connection.

Further, before the obtaining a wireless access point with tag information and push information to-be-displayed corresponding to the wireless access point, the method further includes:

sending, to the network device, a request for searching a wireless access point with tag information, the request including attribute information of a scanned wireless access point.

Further, in the method, the obtaining a wireless access point with tag information and push information to-be-displayed corresponding to the wireless access point includes:

obtaining the wireless access point with tag information sent by the network device and the push information to-be-displayed corresponding to the wireless access point.

Further, in the method, the obtaining a wireless access point with tag information and push information to-be-displayed corresponding to the wireless access point includes:

obtaining a wireless access point with tag information and push information to-be-displayed corresponding to the wireless access point sent by a routing device of the wireless access point, the wireless access point with tag information and the push information to-be-displayed corresponding to the wireless access point being obtained by the routing device of the wireless access point from the network device.

Further, in the method, the attribute information of the wireless access point includes a name and a physical address of the wireless access point.

Further, in the method, for the request sent to the network device for establishing a connection to the target wireless access point, the request for establishing the connection includes attribute information of the user equipment; and for the receiving a connection control to the target wireless access point returned by the network device based on the request for establishing a connection, the connection control is obtained by the network device through verification on the attribute information of the user equipment.

Further, in the method, for the request sent to the network device for establishing a connection to the target wireless access point, the request for establishing the connection includes access authentication information of the target wireless access point; and for the receiving a connection control to the target wireless access point returned by the network device based on the request for establishing a connection, the connection control is obtained by the network device through verification on the access authentication information of the target wireless access point.

Further, in the method, the receiving a connection control to the target wireless access point returned by the network device based on the request for establishing a connection includes:

if verification performed by the network device succeeds, receiving a control of establishing a connection to the target wireless access point returned by the network device based on the request for establishing a connection; or if verification performed by the network device fails, receiving a control of prohibiting establishment of a connection to the target wireless access point returned by the network device.

Further, in the method, after or during the receiving a control of establishing a connection to the target wireless access point returned by the network device, the method further includes:

receiving, from the network device, information of successful establishment of a connection to the target wireless access point; and after or during the receiving a control of prohibiting establishment of a connection to the target wireless access point returned by the network device, the method further includes:

receiving, from the network device, information of unsuccessful establishment of a connection to the target wireless access point.

According to another aspect of the present application, a connection establishing method at a network device side is further provided, including:

selecting a wireless access point with tag information from received wireless access points according to received attribute information of the wireless access points;

sending the wireless access point with tag information and push information to-be-displayed corresponding to the wireless access point to a user equipment or a routing device of the wireless access point; and obtaining a request for establishing a connection to a target wireless access point selected by the user equipment based on the tag information.

Further, after the obtaining a request for establishing a connection to a target wireless access point selected by the user equipment based on the tag information, the method further includes:

returning, to the user equipment based on the request for establishing a connection, a connection control to the target wireless access point.

Further, before the selecting a wireless access point with tag information from received wireless access points according to received attribute information of the wireless access points, the method further includes:

receiving, from the user equipment, a request for searching a wireless access point with tag information, the request including attribute information of a scanned wireless access point.

Further, before the selecting a wireless access point with tag information from received wireless access points according to received attribute information of the wireless access points, the method further includes:

receiving the attribute information of the wireless access point from the routing device of the wireless access point.

Further, in the method, the attribute information of the wireless access point includes a name and a physical address of the wireless access point.

Further, in the method, the selecting a wireless access point with tag information from received wireless access points according to received attribute information of the wireless access points includes:

determining whether the name and the physical address of the wireless access point match the name and the physical address of a wireless access point in a database; and if match, using the wireless access point as a selected target wireless access point.

Further, in the method, for the obtaining a request for establishing a connection to a target wireless access point selected by the user equipment based on the tag information, the request for establishing the connection includes attribute information of the user equipment; and the returning, to the user equipment based on the request for establishing a connection, a connection control to the target wireless access point includes:

verifying the attribute information of the user equipment, and returning, to the user equipment according to a verification result, the connection control to the target wireless access point.

Further, in the method, for the obtaining a request for establishing a connection to a target wireless access point selected by the user equipment based on the tag information, the request for establishing a connection includes access authentication information of the target wireless access point; and the returning, to the user equipment based on the request for establishing a connection, a connection control to the target wireless access point includes:

verifying the access authentication information of the target wireless access point, and returning, to the user equipment according to a verification result, the connection control to the target wireless access point.

Further, in the method, the returning, to the user equipment according to a verification result, the connection control to the target wireless access point includes:

if verification succeeds, returning, to the user equipment, a control of establishing a connection to the target wireless access point; or if verification fails, returning, to the user equipment, a control of prohibiting establishment of a connection to the target wireless access point.

Further, after or during the receiving a control of establishing a connection to the target wireless access point returned by the network device, the method further includes:

sending, to the user equipment, information of successful establishment of a connection to the target wireless access point; and after or during the returning, to the user equipment, a control of prohibiting establishment of a connection to the target wireless access point, the method further includes:

sending, to the user equipment, information of unsuccessful establishment of a connection to the target wireless access point.

According to another aspect of the present application, a connection establishing method at a routing device side of a wireless access point is further provided, including:

sending attribute information of wireless access points to a network device;

receiving a wireless access point with tag information selected by the network device based on the attribute information from the wireless access points and push information to-be-displayed corresponding to the wireless access point; and when a user equipment enters a signal range of a routing device of the wireless access point, sending, to the user equipment, the wireless access point with tag information and the push information to-be-displayed corresponding to the wireless access point.

Further, in the method, the attribute information of the wireless access point includes a name and a physical address of the wireless access point.

According to another aspect of the present application, a user equipment for establishing a connection is further provided, including:

an information obtaining apparatus configured to obtain a wireless access point with tag information and push information to-be-displayed corresponding to the wireless access point, wherein the wireless access point with tag information is selected by a network device from wireless access point(s) scanned by a user equipment according to received attribute information of wireless access points;

a selecting apparatus configured to select a target wireless access point from the wireless access points based on the tag information; and a sending and displaying apparatus configured to: send, to the network device, a request for establishing a connection to the target wireless access point, and display the corresponding push information to-be-displayed.

Further, in the user equipment, the sending and displaying apparatus is further configured to:

receive a connection control to the target wireless access point returned by the network device based on the request for establishing a connection.

Further, in the user equipment, the information obtaining apparatus is further configured to:

send, to the network device, a request for searching a wireless access point with tag information, the request including attribute information of a scanned wireless access point.

Further, in the user equipment, the information obtaining apparatus is configured to:

obtain the wireless access point with tag information and the push information to-be-displayed corresponding to the wireless access point sent by the network device.

Further, in the user equipment, the information obtaining apparatus is configured to:

obtain a wireless access point with tag information and push information to-be-displayed corresponding to the wireless access point sent by a routing device of the wireless access point, the wireless access point with tag information and the push information to-be-displayed corresponding to the wireless access point being obtained by the routing device of the wireless access point from the network device.

Further, in the user equipment, the attribute information of the wireless access point includes a name and a physical address of the wireless access point.

Further, in the user equipment, for the sending and displaying apparatus configured to send, to the network device, a request for establishing a connection to the target wireless access point, the request for establishing the connection includes attribute information of the user equipment; and for the sending and displaying apparatus configured to receive a connection control to the target wireless access point returned by the network device based on the request for establishing a connection, the connection control is obtained by the network device through verification on the attribute information of the user equipment.

Further, in the user equipment, for the sending and displaying apparatus configured to send, to the network device, a request for establishing a connection to the target wireless access point, the request for establishing a connection includes access authentication information of the target wireless access point; and for the sending and displaying apparatus configured to receive a connection control to the target wireless access point returned by the network device based on the request for establishing a connection, the connection control is obtained by the network device through verification on the access authentication information of the target wireless access point.

Further, in the user equipment, the sending and displaying apparatus is configured to:

if verification performed by the network device succeeds, receive a control of establishing a connection to the target wireless access point returned by the network device based on the request for establishing a connection; or if verification performed by the network device fails, receive a control of prohibiting establishment of a connection to the target wireless access point returned by the network device.

Further, in the user equipment, the sending and displaying apparatus is further configured to:

receive, from the network device, information of successful establishment of a connection to the target wireless access point; and after or during the receiving a control of prohibiting establishment of a connection to the target wireless access point returned by the network device, the sending and displaying apparatus is further configured to:

receive, from the network device, information of unsuccessful establishment of a connection to the target wireless access point.

According to another aspect of the present application, a network device for establishing a connection is further provided, including:

a receiving and selecting apparatus configured to select a wireless access point with tag information from received wireless access points according to received attribute information of the wireless access points;

an information sending apparatus configured to send the wireless access point with tag information and push information to-be-displayed corresponding to the wireless access point to a user equipment or a routing device of the wireless access point; and a request obtaining apparatus configured to obtain a request for establishing a connection to a target wireless access point selected by the user equipment based on the tag information.

Further, in the network device, the request obtaining apparatus is further configured to:

return, to the user equipment based on the request for establishing a connection, a connection control to the target wireless access point.

Further, in the network device, the receiving and selecting apparatus is further configured to:

receive, from the user equipment, a request for searching a wireless access point with tag information, the request including attribute information of a scanned wireless access point.

Further, in the network device, the receiving and selecting apparatus is further configured to:

receive the attribute information of the wireless access point from the routing device of the wireless access point.

Further, in the network device, the attribute information of the wireless access point includes a name and a physical address of the wireless access point.

Further, in the network device, the receiving and selecting apparatus is configured to:

determine whether the name and the physical address of the wireless access point match the name and the physical address of a wireless access point in a database; and if match, use the wireless access point as a selected target wireless access point.

Further, in the network device, for the request obtaining apparatus configured to obtain a request for establishing a connection to a target wireless access point selected by the user equipment based on the tag information, the request for establishing the connection includes attribute information of the user equipment; and the returning, to the user equipment based on the request for establishing a connection, a connection control to the target wireless access point includes:

verifying the attribute information of the user equipment, and returning, to the user equipment according to a verification result, the connection control to the target wireless access point.

Further, in the network device, for the request obtaining apparatus configured to obtain a request for establishing a connection to a target wireless access point selected by the user equipment based on the tag information, the request for establishing a connection includes access authentication information of the target wireless access point;

the returning, to the user equipment based on the request for establishing a connection, a connection control to the target wireless access point includes:

verifying the access authentication information of the target wireless access point, and returning, to the user equipment according to a verification result, the connection control to the target wireless access point.

Further, in the network device, the request obtaining apparatus is configured to:

if verification succeeds, return, to the user equipment, a control of establishing a connection to the target wireless access point; or if verification fails, return, to the user equipment, a control of prohibiting establishment of a connection to the target wireless access point.

Further, in the network device, the request obtaining apparatus is further configured to:

send, to the user equipment, information of successful establishment of a connection to the target wireless access point; and after or during the returning, to the user equipment, a control of prohibiting establishment of a connection to the target wireless access point, the request obtaining apparatus is further configured to:

send, to the user equipment, information of unsuccessful establishment of a connection to the target wireless access point.

According to another aspect of the present application, a routing device of a wireless access point for establishing a connection is further provided, the routing device including:

an information uploading apparatus configured to send attribute information of wireless access points to a network device;

an information receiving apparatus configured to receive a wireless access point with tag information selected by the network device based on the attribute information from the wireless access points and push information to-be-displayed corresponding to the wireless access point; and an information delivering apparatus configured to: when a user equipment enters a signal range of a routing device of the wireless access point, send, to the user equipment, the wireless access point with tag information and the push information to-be-displayed corresponding to the wireless access point.

Further, in the routing device, the attribute information of the wireless access point includes a name and a physical address of the wireless access point.

According to another aspect of the present application, a calculation-based device is further provided, including:

a processor; and a memory configured to store a computer executable instruction that, when executed, causes the processor to obtain a wireless access point with tag information and push information to-be-displayed corresponding to the wireless access point, where the wireless access point with tag information is selected by a network device from wireless access point(s) scanned by a user equipment according to received attribute information of wireless access points;

select a target wireless access point from the wireless access points based on the tag information; and send, to the network device, a request for establishing a connection to the target wireless access point, and display the corresponding push information to-be-displayed.

According to another aspect of the present application, a calculation-based device is further provided, including:

a processor; and a memory configured to store a computer executable instruction that, when executed, causes the processor to select a wireless access point with tag information from received wireless access points according to received attribute information of the wireless access points;

send the wireless access point with tag information and push information to-be-displayed corresponding to the wireless access point to a user equipment or a routing device of the wireless access point; and obtain a request for establishing a connection to a target wireless access point selected by the user equipment based on the tag information.

According to another aspect of the present application, a calculation-based device is further provided, including:

a processor; and a memory configured to store a computer executable instruction that, when executed, causes the processor to send attribute information of wireless access points to a network device;

receive a wireless access point with tag information selected by the network device based on the attribute information from the wireless access points and push information to-be-displayed corresponding to the wireless access point; and when a user equipment enters a signal range of a routing device of the wireless access point, send, to the user equipment, the wireless access point with tag information and the push information to-be-displayed corresponding to the wireless access point.

Compared to the prior art, according to the present application, the wireless access point with tag information and the push information to-be-displayed corresponding to the wireless access point are obtained at the user equipment side, where the wireless access point with tag information is selected by a network device from wireless access point(s) scanned by a user equipment according to the received attribute information of the wireless access points; when the user equipment is to establish a connection to the wireless access point with tag information, the target wireless access point is selected based on the tag information from the wireless access points, and the request for establishing a connection to the target wireless access point is sent to the network device, and the corresponding push information to-be-displayed is displayed, so that the corresponding push information to-be-displayed may be displayed during establishment of a connection between the user equipment and the target wireless access point, thus relieving anxiety of a user corresponding to the user equipment during waiting and shifting attention from waiting; and a connection control to the target wireless access point returned by the network device based on the request for establishing a connection is received, so as to control establishment of connection between the user equipment and the target wireless access point.

Further, according to the present application, the wireless access point with tag information is selected from the received wireless access points at the network device side according to the received attribute information of the wireless access points, and the selected wireless access point with tag information and the push information to-be-displayed corresponding to the wireless access point are sent to the user equipment or the routing device of the wireless access point, so that the user equipment can rapidly obtain the tag information of the preferred wireless access point and the push information to-be-displayed, or can rapidly obtain the tag information of the preferred wireless access point sent by the wireless access point and the push information to-be-displayed when entering the signal range of a routing device of the preferred wireless access point; next, the network device obtains the request for establishing a connection to the target wireless access point selected by the user equipment based on the tag information; and then the connection control to the target wireless access point is returned to the user equipment based on the request for establishing a connection, so as to control the connection between the user equipment and the target wireless access point.

Further, according to the present application, the attribute information of the wireless access point is sent to the network device at the routing device side of the wireless access point; the wireless access point with tag information selected by the network device based on the attribute information from the wireless access points and the corresponding push information to-be-displayed are received, so that the wireless access point with tag information and the corresponding push information to-be-displayed are sent to the user equipment when the user equipment enters the signal range of the wireless access point, and the user equipment can rapidly obtain the tag information of the preferred wireless access point when entering the signal range of the routing device of the wireless access point, and can rapidly establish a connection to the target wireless access point based on the tag information, and the user equipment displays the corresponding push information to-be-displayed when a connection is established.

BRIEF DESCRIPTION OF THE DRAWINGS

Other features, objectives, and advantages of this application will become more obvious by reading the detailed description of nonlimitative embodiments that is provided with reference to the following accompanying drawings.

A same or similar reference numeral in the drawings represents a same or similar component.

DETAILED DESCRIPTION OF THE EMBODIMENTS

This application is further described below in detail with reference to the accompanying drawings.

In a typical configuration of this application, a terminal, a device of a service network, and a trusted party all include one or more processors (CPUs), an input/output interface, a network interface, and a memory.

The memory may include a form such as a persistent memory, a random-access memory (RAM) and/or a non-volatile memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of a storage medium of a computer include, but are not limited to, a phase-change memory (PRAM), a static random-access memory (SRAM), a dynamic random-access memory (DRAM), a RAM of another type, a ROM, an electrically erasable programmable read-only memory (EEPROM), a flash memory or another memory technology, a compact disc read-only memory (CD-ROM), a digital versatile disc (DVD) or another optical storage device, a cassette tape, disk and tape memory or another magnetic storage device, or any other non-transmission media, which may be configured to store information that can be accessed by a computing device. According to limitations of this specification, the computer-readable medium does not include a non-transitory computer-readable medium (transitory media), such as a modulated data signal and a modulated carrier.

Figure 1:
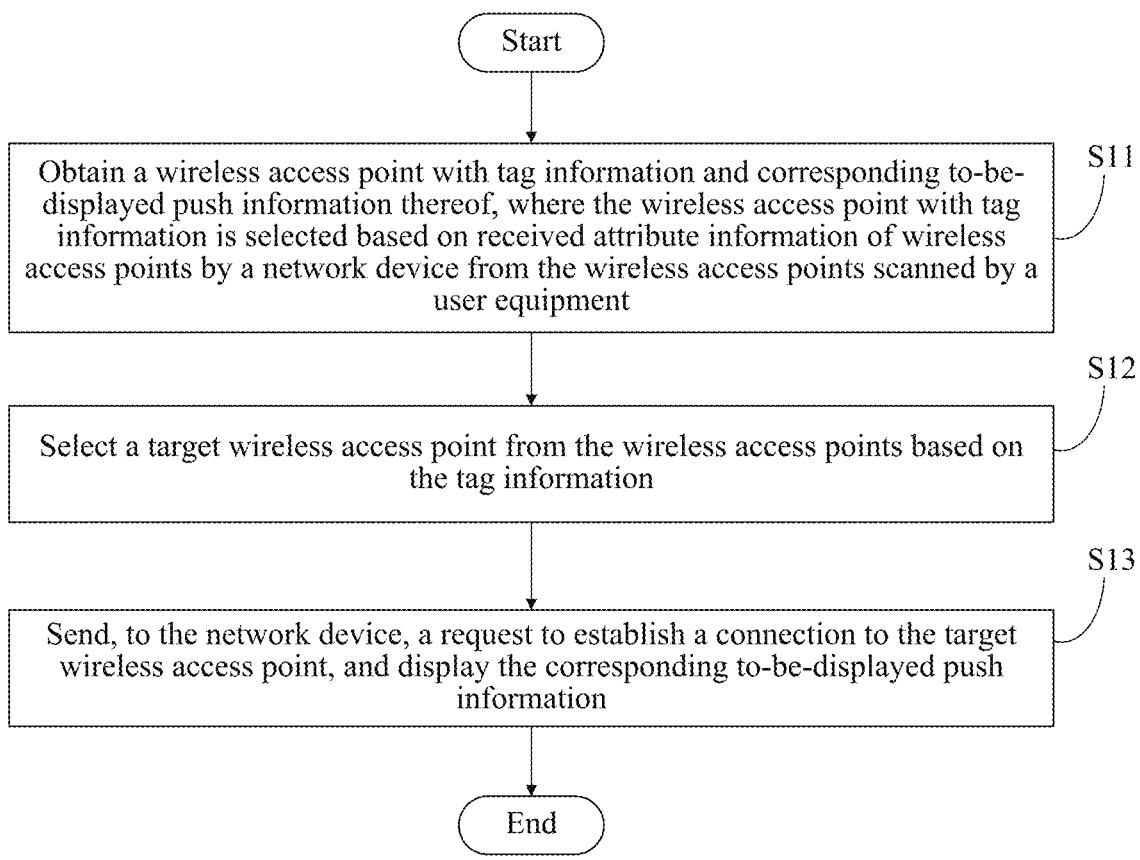
FIG. 1 is a schematic flowchart of a connection establishing method at a user equipment side according to an aspect of the present application.

FIG. 1 is a schematic flowchart of a connection establishing method at a user equipment side according to an aspect of the present application. The method is applied to a user equipment side during establishment of a wireless connection and includes step S11, step S12, and step S13.

In step S11, a wireless access point with tag information and push information to-be-displayed corresponding to the wireless access point are obtained. The wireless access point with tag information is selected by a network device from wireless access point(s) scanned by a user equipment according to received attribute information of wireless access points. When the user equipment is to establish a connection to a preferred wireless access point, in step S12, a target wireless access point is selected from the wireless access points based on the tag information. In step S13, a request for establishing a connection to the target wireless access point is sent to the network device, and the corresponding push information to-be-displayed is displayed, so that the corresponding push information to-be-displayed may be displayed during establishment of a connection between the user equipment and the target wireless access point, thus relieving anxiety of a user corresponding to the user equipment during waiting and shifting attention from waiting. Following step S13, the user equipment receives a connection control to the target wireless access point returned by the network device based on the request for establishing a connection, so as to control establishment of a connection between the user equipment and the target wireless access point, thereby completing establishment of a wireless connection between the user equipment and the target wireless access point.

The tag information in the wireless access point with tag information herein is used to indicate that a connection to the wireless access point may be free of charge, or is used to indicate that the wireless access point is in cooperation or alliance with a connection software provider of the wireless access point (which means that access authentication information for establishing a connection is not required), or is used to indicate that a connection to the wireless access point may be established and/or a success rate of establishing a connection to the wireless access point is high. The wireless access point with the foregoing tag information is obtained at the user equipment side, so that a user of the user equipment may select a target wireless access point with tag information based on the tag information. If tag information of the target wireless access point with tag information indicates that a connection to the target wireless access point is free of charge, the user equipment may establish a connection to the target wireless access point free of charge. If the target wireless access point with tag information is in cooperation or alliance with a connection software provider, the user may directly establish a connection to the target wireless access point at the user equipment side without access information for establishing a connection, so that an operation of obtaining the access information is omitted, thereby improving connection efficiency. If the target information of the target wireless access point with tag information is information indicating a high success rate of connection, the user may directly select, at the user equipment side, a target wireless access point with tag information indicating a high success rate of connection, so as to rapidly establish a connection to the target wireless access point with a high success rate of connection, thereby improving a success rate of connection and improve the connection efficiency.

Further, the attribute information of the wireless access point includes a name and a physical address of the wireless access point. It should be noted that the attribute information of the wireless access point may include but is not limited to a name (such as a service set identifier (SSID)) and a physical address (such as a media access control MAC address) of a wireless access point. The MAC address may be a BSSID of the wireless access point. Definitely, the attribute information of the wireless access point may also include an encryption type and the like of the wireless access point. Definitely, those skilled in the art shall understand that other existing attribute information or any other future possible attribute information of the wireless access point shall also fall within the protection scope of the present application and be included herein by reference if applicable to the present application.

It should be noted that the wireless access point with tag information may include a wireless access point to which a connection may be established free of charge, or a wireless access point with a high success rate of connection, or a wireless access point in cooperation or alliance with a connection software provider of the wireless access point and requiring no access authentication information. Therefore, after scanning the wireless access points with tag information, the user equipment may rapidly select, from the displayed wireless access points with tag information based on the tag information, a target wireless access point to which a connection may be established free of charge, a target wireless access point with a high success rate of connection, or a wireless access point in cooperation or alliance with a connection software provider of the wireless access point and requiring no access authentication information, so as to rapidly select a target wireless access point to which a connection needs to be established, thereby improving the connection efficiency.

It should be noted that, the push information to-be-displayed may include but is not limited to one or any combination of a text, audio, a video, and a picture. The push information to-be-displayed may be advertisement push information corresponding to a preferred wireless access point, and the advertisement push information may be advertiser information and corresponding advertisement content, etc. The push information to-be-displayed may also be product push information corresponding to the preferred wireless access point, and the product push information may be information of a product brand and information of a product description, etc. The push information to-be-displayed may also be push information of a video such as an advertisement or a film, etc. corresponding to the wireless access point with tag information. Definitely, those skilled in the art shall understand that other existing o-be-displayed push information or any other future possible push information to-be-displayed of the wireless access point shall also fall within the protection scope of the present application and be included herein by reference if applicable to the present application.

In an embodiment of the present application, when all of the wireless access points obtained by the user equipment have no tag information, push information to-be-displayed corresponding to a preferred wireless access point is not displayed during establishment of a connection between the user equipment and a wireless access point. Instead, locally stored default connection animation information is displayed during establishment of the connection, to notify the user of the user equipment of a current connection progress and a current connection status of a wireless connection between the user equipment and the wireless access point.

Figure 2:
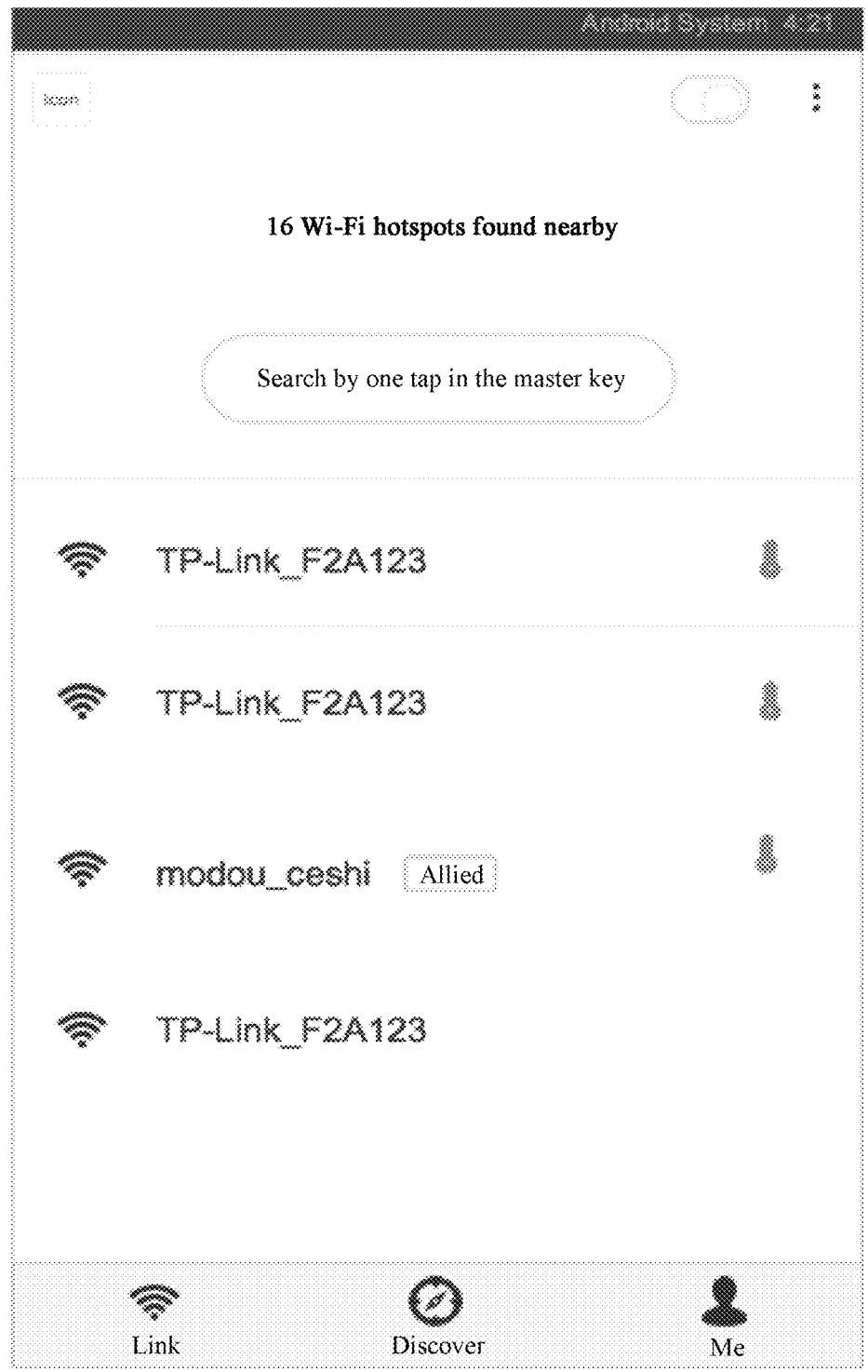
FIG. 2 is a diagram of an actual application scenario of searching for a wireless access point in a connection establishing method at a user equipment side according to an aspect of the present application.

Further, before the wireless access point with tag information and the push information to-be-displayed corresponding to the wireless access point are obtained in step S11, the method further includes: sending, to the network device, a request for searching a wireless access point with tag information, the request including attribute information of a scanned wireless access point. For example, as shown in FIG. 2, when the user equipment needs to determine a wireless access point with tag information in the wireless access points, the user equipment performs step S11 to send, to the network device, the request for searching a wireless access point with tag information. The searching request includes the attribute information of the wireless access point scanned by the user equipment, so that the network device obtains, according to the attribute information of the wireless access point in the received searching request, the wireless access point with tag information through matching, thereby sending, to the user equipment, the wireless access point with tag information and the push information to-be-displayed corresponding to the wireless access point. On one hand, the user equipment receives the wireless access point with tag information and the push information to-be-displayed corresponding to the wireless access point only when sending the searching request to the network device, to reduce processing resources and memory resources for the user equipment to receive and store the wireless access point with tag information and the push information to-be-displayed. On the other hand, the user equipment obtains the scanned wireless access point with tag information and the push information to-be-displayed corresponding to the wireless access point through step S11, so that the user equipment establishes a connection to the target wireless access point using the tag information. The push information to-be-displayed may be further displayed during establishment of the connection, to relieve anxiety of the user of the user equipment during waiting for establishment of the connection.

Figure 4:
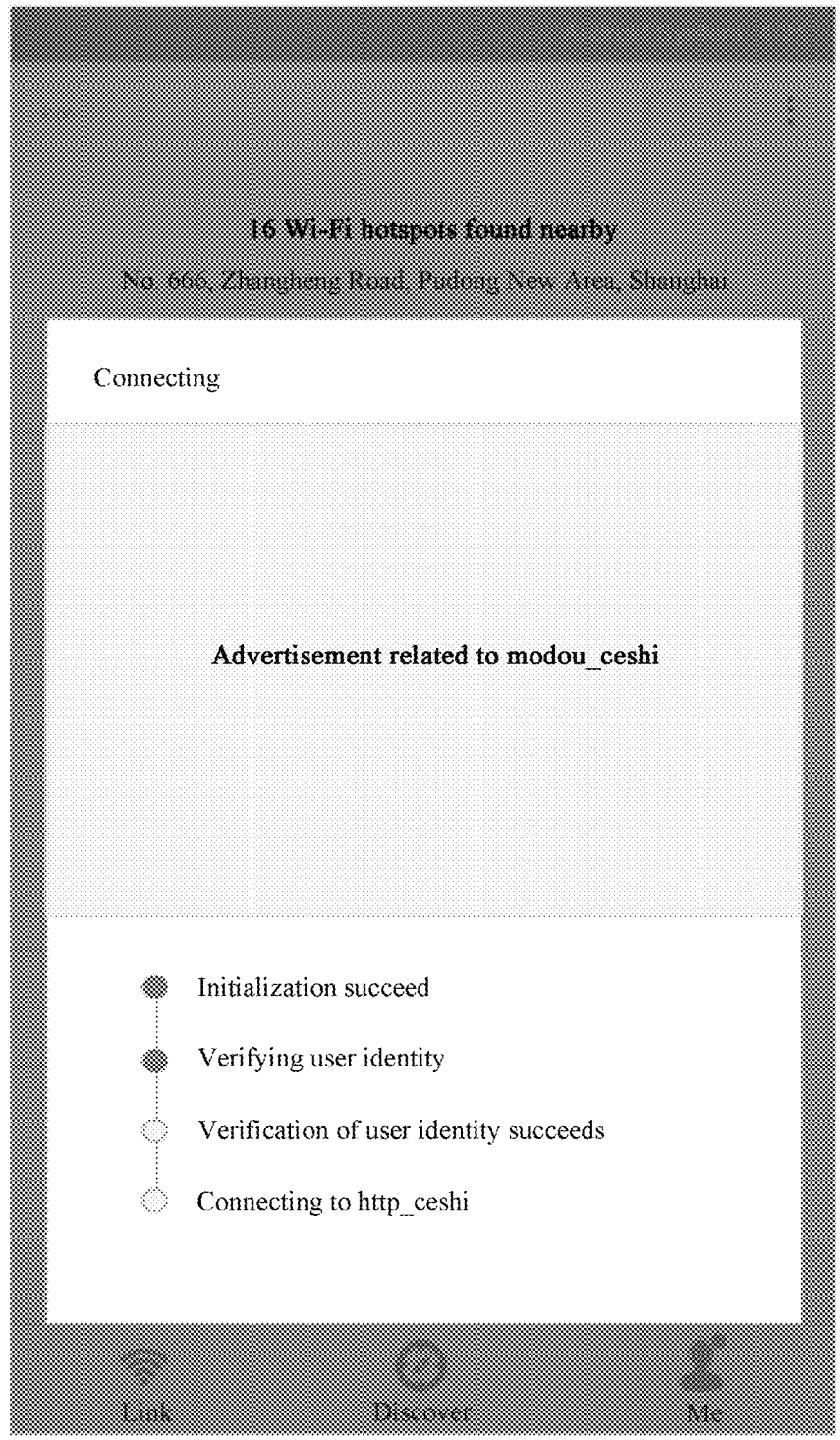
FIG. 4 is a diagram of an actual application scenario of a connection establishing process and displaying of push information to-be-displayed in a connection establishing method at a user equipment side according to an aspect of the present application.

Further, step S11 in which a wireless access point with tag information and push information to-be-displayed corresponding to the wireless access point are obtained includes: obtaining the wireless access point with tag information and the push information to-be-displayed corresponding to the wireless access point sent by the network device. For example, in order to ensure that the user equipment can rapidly obtain the tag information of the wireless access point with tag information and establish a connection, when the wireless access point with tag information and the push information to-be-displayed corresponding to the wireless access point are stored at the network device side, the wireless access point with tag information and the push information to-be-displayed corresponding to the wireless access point are delivered to the user equipment. Afterwards, in step S11, the user equipment obtains a wireless access point with tag information and push information to-be-displayed corresponding to the wireless access point delivered by the network device. As shown in FIG. 2, the tag information may represent that the wireless access point with tag information to which the tag information belongs may be shared or a connection may be established free of charge. A wireless access point modou_ceshi in FIG. 2 is the wireless access point with tag information. The tag information of the wireless access point with tag information is reflected using an alliance tag, helping the user equipment to rapidly establish, free of charge based on the tag information (for example, the alliance tag), a connection to the selected target wireless access point (modou_ceshi) to which a connection needs to be established, which is shown in FIG. 4. Not only a success rate of a connection to the target wireless access point is ensured, but also the corresponding push information to-be-displayed (for example, an advertisement related to modou_ceshi) is displayed to relieve anxiety of the user of the user equipment during waiting, thereby improving user experience.

Further, step S11 in which a wireless access point with tag information and push information to-be-displayed corresponding to the wireless access point are obtained includes: obtaining a wireless access point with tag information and push information to-be-displayed corresponding to the wireless access point sent by a routing device of the wireless access point, the wireless access point with tag information and the push information to-be-displayed corresponding to the wireless access point being obtained by the routing device of the wireless access point from the network device. For example, if the wireless access point with tag information and the corresponding push information to-be-displayed are pre-sent to the routing device of the wireless access point, after the user equipment enters a signal range of the routing device of the wireless access point, the wireless access point sends, to the user equipment, all wireless access points with tag information and corresponding push information to-be-displayed. Afterwards, in step S11, scanning may be performed, so that sending, to the network device, of a request for searching the wireless access point with tag information is omitted. Therefore, not only resources consumed for a processing procedure of sending the searching request are reduced, a target wireless connection point to which a connection needs to be established is rapidly selected based on the wireless access point with tag information sent by the routing device of the wireless access point, so as to establish a connection. In addition, corresponding push information to-be-displayed (for example, advertisement content corresponding to the selected target wireless access point) may be further displayed during establishment of the connection.

Further, if the selected target wireless access point is an allied wireless access point with tag information requiring no access authentication information, for step S13 of sending a request for establishing a connection to a target wireless access point to the network device, the request for establishing the connection includes attribute information of the user equipment; and for the receiving a connection control to the target wireless access point returned by the network device based on the request for establishing a connection, the connection control is obtained by the network device through verification on the attribute information of the user equipment.

It should be noted that, the attribute information of the user equipment is information for connection determining included in a request for establishing a connection to the target wireless access point with an alliance tag, and may include but is not limited to a user identifier (that is, a user ID), an equipment identifier (that is, an equipment ID) of the user equipment, and content of a connection protocol for connection, etc. The attribute information of the user equipment is used to uniquely indicate an identity of the user equipment, so that the network device verifies an identity of the user according to the received attribution information of the user equipment, thereby ensuring validity and safety of the identity of the user equipment for establishing a connection.

Figure 3:
FIG. 3 is a diagram of an actual application scenario of establishing a connection to a preferred wireless access point in a connection establishing method at a user equipment side according to an aspect of the present application.

In an embodiment of the present application, as shown in FIG. 3, in step S12, the user equipment selects a target wireless access point (for example, modou_ceshi) based on the tag information (for example, an alliance table tag), and sends, to the network device, a request for establishing a connection to the target wireless access point (for example, modou_ceshi). The request for establishing a connection includes attribute information (such as a user ID or an equipment ID) of the user equipment. After the user of the user equipment taps key connect under the target wireless access point (for example, modou_ceshi) in FIG. 3, the user equipment obtains the request for establishing a connection to the target wireless access point (for example, modou_ceshi) sent to the network device, so that the network device verifies the identity of the user equipment based on the attribute information of the user equipment, and sends connection control obtained after identity verification to the user equipment, which is shown in FIG. 4. In this case, in step S13, a connection control to the target wireless access point returned by the network device based on the request for establishing a connection is received, to control establishment of a connection between the user equipment and a preferred wireless access point, thereby preventing an unauthorized user from establishing a connection to the target wireless access point free of charge and ensuring safety.

Further, if the selected target wireless access point is a wireless access point with tag information to which a connection may be established free of charge without verification on the identity of the user equipment, for step S13 of sending, to the network device, a request for establishing a connection to the target wireless access point, the request for establishing a connection includes access authentication information of the target wireless access point; and for the receiving a connection control to the target wireless access point returned by the network device based on the request for establishing a connection, the connection control is obtained by the network device through verification on the access authentication information of the target wireless access point.

It should be noted that the access authentication information of the target wireless access point may include but is not limited to an access password, an access verification identification code, and an access verification token, etc., so that a valid wireless connection to the target wireless access point is allowed after verification performed by the network device on the access authentication information succeeds, thereby ensuring safety and validity of a connection to a target wireless access point that is established free of charge without verification on the identity of the user equipment. Further, step S13 in which a connection control to the target wireless access point returned by the network device based on the request for establishing a connection is received includes:

if verification performed by the network device succeeds, receiving a control of establishing a connection to the target wireless access point returned by the network device based on the request for establishing a connection; or if verification performed by the network device fails, receiving a control of prohibiting establishment of a connection to the target wireless access point returned by the network device.

In an embodiment of the present application, during establishment of the connection between the user equipment and the target wireless access point, if identity verification on the attribute information of the user equipment in the request for establishing a connection sent by the network device to the user equipment succeeds, or verification on the access authentication information of the target wireless access point succeeds, the network device returns, to the user equipment, a control of establishing a connection to the target wireless access point. After the user equipment receives the connection control to the target wireless access point returned by the network device in step S13, establishment of a wireless connection between the user equipment and the target wireless access point is controlled through the control of establishing a connection. If identity verification on the attribute information of the user equipment in the request for establishing a connection sent by the network device to the user equipment fails, or verification on the access authentication information of the target wireless access point fails, the network device returns, to the user equipment, the control of prohibiting establishment of a connection to the target wireless access point. After the user equipment receives the control of prohibiting establishment of a connection to the target wireless access point returned by the user equipment in step S13, establishment of a wireless connection between the user equipment and the target wireless access point is prohibited through the control of prohibiting establishment of a connection. Therefore, not only a wireless connection is established between a verified user equipment and the target wireless access point, but also an unverified unauthorized user equipment is prevented from establishing a wireless connection to the target wireless access point, thereby ensuring safety of the target wireless access point that may be shared or to which a wireless connection may be established free of charge.

Further, after or during receiving of a control of establishing a connection to the target wireless access point returned by the network device step S13, the method further includes:

receiving, from the network device, information of successful establishment of a connection to the target wireless access point; and after or during the receiving a control of prohibiting establishment of a connection to the target wireless access point returned by the network device, the method further includes:

receiving, from the network device, information of unsuccessful establishment of a connection to the target wireless access point.

In an embodiment of the present application, after or during returning of the connection control to the target wireless access point to the user equipment performed by the network device, in order to help the user of the user equipment learn in real time whether a connection between the user equipment and the target wireless access point is successful, the user equipment further receives, from the network device, information of successful establishment of a connection to the target wireless access point, so as to notify the user of the user equipment of successful establishment of a connection between the user equipment and the target wireless access point. After or during returning of the control of prohibiting establishment of a connection to the target wireless access point to the user equipment performed by the network device, information of unsuccessful establishment of a connection to the target wireless access point is further received from the network device, so as to notify the user of the user equipment of unsuccessful connection of a connection between the user equipment and the target wireless access point, so that the user equipment can rapidly establish a connection to other wireless access points with tag information that may be shared or to which a connection may be established free of charge.

Following the foregoing embodiments of the present application, after the wireless access point with tag information is obtained in step S11, the method further includes: displaying the preferred wireless access point and corresponding tag information. For example, after the user equipment obtains tag information of a wireless access point with tag information in step S11, as shown in FIG. 2, the wireless access point with tag information and the corresponding tag information are displayed, so that the user of the user equipment can rapidly see tag information used to indicate sharing free of charge or a high success rate of connection, and can rapidly identify the wireless access point with tag information and rapidly establish a connection to the wireless access point. Therefore, not only costs generated when the user blindly attempts to establish a connection one by one and costs for trial and error can be reduced, but also a success rate of establishing a connection between the user equipment and the preferred wireless access point with tag information and efficiency of connection establishment can be improved.

Figure 5:
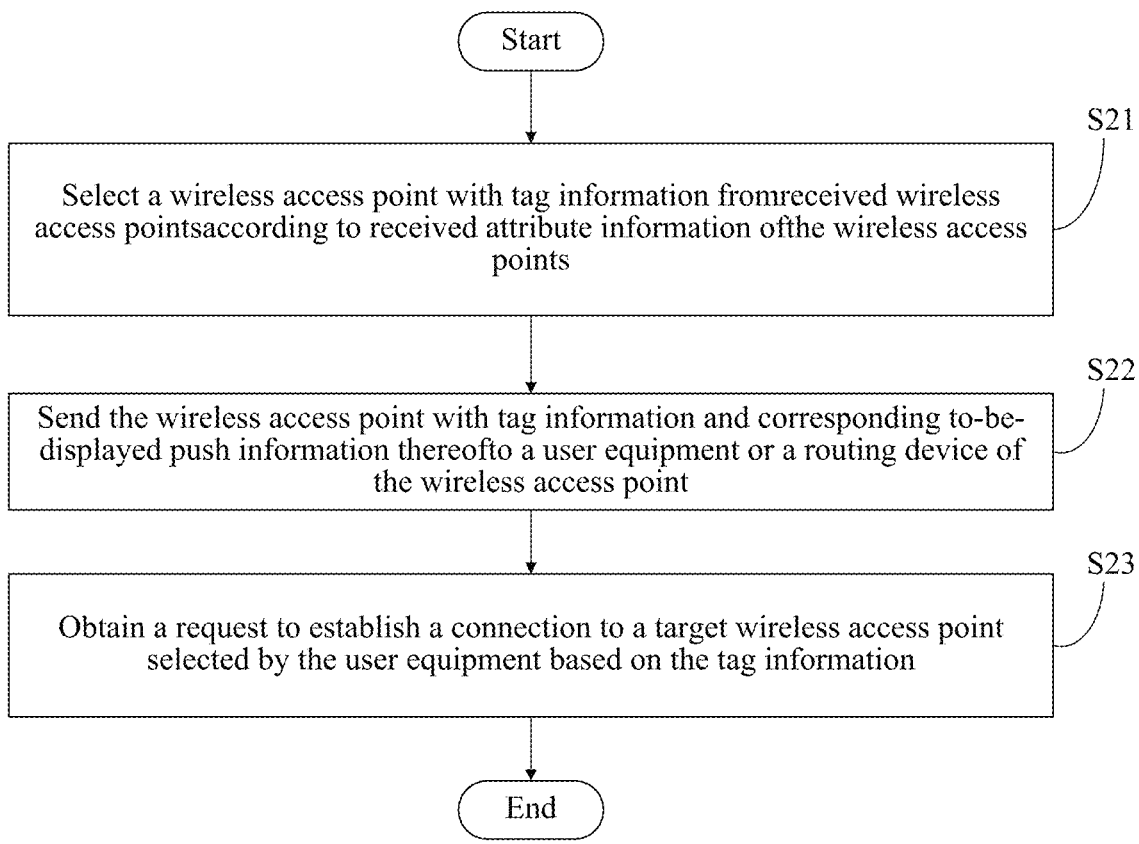
FIG. 5 is a schematic flowchart of a connection establishing method at a network device side according to another aspect of the present application.

FIG. 5 is a schematic flowchart of a connection establishing method at a network device side according to another aspect of the present application. The method is applied to a network device side during establishment of a wireless connection, and includes step S21, step S22, and step S23.

In step S21, a wireless access point with tag information is selected from received wireless access points according to received attribute information of the wireless access points.

In step S22, the wireless access point with tag information and corresponding push information to-be-displayed are sent to the user equipment or the wireless access point, so that the user equipment can rapidly obtain the tag information of the wireless access point with tag information and the push information to-be-displayed, or can rapidly obtain the tag information of the wireless access point with tag information and the push information to-be-displayed sent by the wireless access point when entering a signal range of a routing device of the wireless access point with tag information. Next, the network device performs step S23 to obtain a request for establishing a connection to a target wireless access point selected by the user equipment based on the tag information. Following step S23, the network device returns a connection control to the target wireless access point to the user equipment based on the request for establishing a connection, so as to control establishment of the connection between the user equipment and the target wireless access point, so that not only the network device delivers the wireless access point with tag information and the corresponding push information to-be-displayed to the user equipment, but also establishment of the connection between the user equipment and the target wireless access point is controlled using the obtained request for establishing a connection sent by the user equipment.

It should be noted that the tag information of the wireless access point with tag information is used to indicate that a connection may be established to the wireless access point free of charge, or that the wireless access point is shared and a connection may be established, or that the wireless access point has a high success rate of connection. The tag information of the wireless access point is obtained at the user equipment side, so that the user equipment may select the target wireless access point with tag information based on the tag information, and rapidly establish a connection to the target wireless access point free of charge, thereby improving a success rate of connection and improving connection efficiency.

Further, the attribute information of the wireless access point includes a name and a physical address of the wireless access point. It should be noted that the attribute information of the wireless access point may include but is not limited to a name (such as a service set identifier (SSID)) and a physical address (such as a media access control MAC address) of a wireless access point. The MAC address may be a BSSID of the wireless access point. Definitely, the attribute information of the wireless access point may also include an encryption type and the like of the wireless access point. Definitely, those skilled in the art shall understand that other existing attribute information or any other future possible attribute information of the wireless access point shall also fall within the protection scope of the present application and be included herein by reference if applicable to the present application.

It should be noted that, the wireless access point with tag information includes a wireless access point that is free of charge, that has a high success rate of connection, or that is allied and requires no access authentication information. The wireless access point with tag information may be a wireless access point that may be allied free of charge or shared for cooperation, and may include but is not limited to a wireless access point that is shared, to which a connection may be established free of charge, or that has a high success rate of connection, so that the user equipment may rapidly establish a connection free of charge without a connection password after scanning a preferred wireless access point, thereby improving a success rate of connection between the user equipment and the wireless access point with tag information and connection efficiency.

It should be noted that, the push information to-be-displayed may include but is not limited to one or any combination of a text, audio, a video, and a picture. The push information to-be-displayed may be advertisement push information corresponding to a preferred wireless access point, and the advertisement push information may be advertiser information and corresponding advertisement content, etc. The push information to-be-displayed may also be product push information corresponding to the preferred wireless access point, and the product push information may be information of a product brand and information of a product description, etc. The push information to-be-displayed may also be push information of a video such as an advertisement or a film, etc. corresponding to the wireless access point with tag information. Definitely, those skilled in the art shall understand that other existing o-be-displayed push information or any other future possible push information to-be-displayed of the wireless access point shall also fall within the protection scope of the present application and be included herein by reference if applicable to the present application.

Further, before the wireless access point with tag information is from the received wireless access points according to the attribute information of the received wireless access points in step S21, the method further includes: receiving, from the user equipment, a request for searching a wireless access point with tag information, the request including attribute information of a scanned wireless access point. For example, when the user equipment needs to establish a connection to a wireless connection point that is free of charge or that has a high success rate of connection but does not know a wireless access point with a tag that is free of charge or that has a high success rate of connection, the user equipment sends a searching request to the network device. In this case, before step S21, the network device receives, from the user equipment, a request for searching a wireless access point with a tag. The searching request includes attribute information of all scanned wireless access points. Next, in step S21, a preferred wireless access point to which a connection may be established free of charge or that has a high success rate of connection is selected from all of the wireless access points according to received attribute information of the wireless access points scanned by the user equipment, and then the wireless access point with tag information and corresponding push information to-be-displayed are sent to the user equipment. Therefore, screening is performed on all of the wireless access points scanned by the user equipment, and the selected wireless access point with tag information and the corresponding push information to-be-displayed are delivered to the user equipment, so that the user equipment can rapidly establish a connection to the target wireless access point based on the tag information, and display the push information to-be-displayed.

Further, before the wireless access point with tag information is received from the received wireless access points according to the attribute information of the wireless access points in step S21, the method further includes: receiving attribute information of the wireless access point from a routing device of the wireless access point. For example, when the wireless access point with tag information needs to be marked, the wireless access point sends attribute information corresponding to the wireless access point to the network device, so that the network device selects the wireless access point with tag information according to the received attribute information of the wireless access point in step S21. In other words, when the received wireless access points in step S21 include wireless access points: three TP-Link_F2A123 and modou_ceshi in FIG. 2, screening is performed on the wireless access points according to attribute information of the wireless access points (such as a name and a corresponding physical address, etc. of the wireless access point), to obtain a selected wireless access point modou_ceshi with tag information, so that the network device directly obtains attribute information corresponding to the wireless access point from the wireless access point.

Further, step S21 in which the wireless access point with tag information is from the received wireless access point according to the received attribute information of the wireless access points includes:

determining whether the name and the physical address of the wireless access point match the name and the physical address of a wireless access point in a database; and if match, using the wireless access point as a selected target wireless access point.

In an embodiment of the present application, in order to select, mark, and display a wireless access point with tag information to which a connection may be established free of charge or that has a high success rate of connection, after the network device receives the attribute information of the wireless access point (such as a name (SSID) and a physical address (BSSID) of the wireless access point), in step S21, it is determined whether the name (SSID) and the physical address (BSSID) of the wireless access point match the name and the physical address of wireless access point in the database of the network device. If there is a matched name and a matched physical address of the wireless access point, the wireless access point is used as a selected wireless access point with tag information, and tag information (an alliance tag) of the wireless access point with tag information and corresponding push information to-be-displayed (for example, corresponding advertisement content) are sent to the user equipment, to screen the wireless access points in the network device, and the selected wireless access point with tag information is determined as a preferred wireless access point, so that the user equipment may establish a connection to the preferred wireless access point at a high success rate based on the tag information of the wireless access point with tag information, and display push information to-be-displayed corresponding to the wireless access point.

In order to ensure safety of the preferred wireless access point to which a connection may be established free of charge or that has a high success rate of connection and the push information to-be-displayed corresponding to the wireless access point, if the selected target wireless access point is an allied wireless access point with tag information requiring no access authentication information, in step S22, the obtained request for establishing a connection to a target wireless access point selected by the user equipment based on the tag information includes attribute information of the user equipment (such as an equipment ID or a user ID of the user equipment), and step S23 in which the connection control to the target wireless access point is returned to the user equipment based on the request for establishing a connection includes: verifying the attribute information of the user equipment, and returning, to the user equipment, the connection control to the target wireless access point according to a verification result, so that the network device controls establishment of a connection between the user equipment and the target wireless access point with tag information, that is, the network device verifies validity of the attribute information of the user equipment, thereby preventing an unauthorized user from establishing a connection to the wireless access point with tag information to which a connection may be established free of charge or that has a high success rate of connection, and ensuring safety of the connection to the target wireless access point with tag information and safety of the push information to-be-displayed corresponding to the wireless access point.

Following the foregoing embodiment of the present application, if the selected target wireless access point is the wireless access point with tag information to which a connection may be established free of charge and requiring no verification on an identity of the user equipment, for step S21 of obtaining request for establishing a connection to the target wireless access point selected by the user equipment based on the tag information, the request for establishing a connection includes access authentication information of the target wireless access point; and the returning, to the user equipment based on the request for establishing a connection, a connection control to the target wireless access point includes:

verifying the access authentication information of the target wireless access point, and returning, to the user equipment according to a verification result, the connection control to the target wireless access point.

It should be noted that the access authentication information of the target wireless access point may include but is not limited to an access password, an access verification identification code, and an access verification token, etc., so that a valid wireless connection to the target wireless access point is allowed after verification performed by the network device on the access authentication information succeeds, thereby ensuring safety and validity of a connection to a target wireless access point that is established free of charge without verification on the identity of the user equipment. Further, step S23 in which the connection control to the target wireless access point is returned to the user equipment based on the verification result includes:

if verification succeeds, returning, to the user equipment, a control of establishing a connection to the target wireless access point; or if verification fails, returning, to the user equipment, a control of prohibiting establishment of a connection to the target wireless access point.

In an embodiment of the present application, during establishment of a connection between the user equipment and the target wireless access point, in order to ensure safety of the wireless access point with tag information and the corresponding push information to-be-displayed, the attribute information of the user equipment is judged or the access authentication information of the target wireless access point is verified. If identity verification performed by the network device on the attribute information of the user equipment in the request for establishing a connection sent by the user equipment succeeds, or verification on the access authentication information of the target wireless access point succeeds, in step S23, the control of establishing a connection to the target wireless access point is returned to the user equipment, so that the user equipment controls establishment of a wireless connection between the user equipment and the target wireless access point through the control of establishing a connection. If identity verification performed by the network device on the attribute information of the user equipment in the request for establishing a connection sent by the user equipment fails, or verification on the access authentication information of the target wireless access point fails, in step S23, the control of prohibiting establishment of a connection to the target wireless access point is returned to the user equipment, so that the user equipment is prohibited from establishing a wireless connection to the target wireless access point through the control of prohibiting establishment of a connection. Therefore, not only a wireless connection is established between a verified user equipment and the target wireless access point, and an unverified unauthorized user equipment is prevented from establishing a connection to the target wireless access point. Alternatively, an unauthorized user and an unauthorized competitor are prevented from establishing a connection to a preferred wireless access point free of charge, using the wireless access point, and obtaining corresponding push information to-be-displayed after cracking the preferred wireless access point through an application (APP), so that the target wireless access point to which a wireless connection may be established free of charge or shared and corresponding push information to-be-displayed are safely protected.

Further, after or during returning of a control of establishing a connection to the target wireless access point to the user equipment in step S23, the method further includes:

sending, to the user equipment, information of successful establishment of a connection to the target wireless access point; and after or during the returning, to the user equipment, a control of prohibiting establishment of a connection to the target wireless access point, the method further includes:

sending, to the user equipment, information of unsuccessful establishment of a connection to the target wireless access point.

In an embodiment of the present application, after or during returning of a control of establishing a connection to the target wireless access point to the user equipment performed by the network device in step S23, in order notify a user of the user equipment of successful establishment of a connection, in step S23, the information of successful establishment of a connection to the target wireless access point is further sent to the user equipment, so that the user of the user equipment can learn that a connection is successfully established between the user equipment and the target wireless access point. After or during returning of a control of prohibiting establishment of a connection to the target wireless access point to the user equipment performed by the network device returns in step S23, in order to notify the user of the user equipment of unsuccessful establishment of a connection such that the user equipment attempts other preferred wireless access points to which a connection may be established free of charge or that have a high success rate of connection, in step S23, the information of unsuccessful establishment of a connection to the target wireless access point is further sent to the user equipment, to notify the user of the user equipment of a result of unsuccessful establishment of a connection to the target wireless access point, so that the user equipment attempts to establish a connection to other preferred wireless access points to which a connection may be established free of charge or that have a high success rate of connection.

Figure 6:
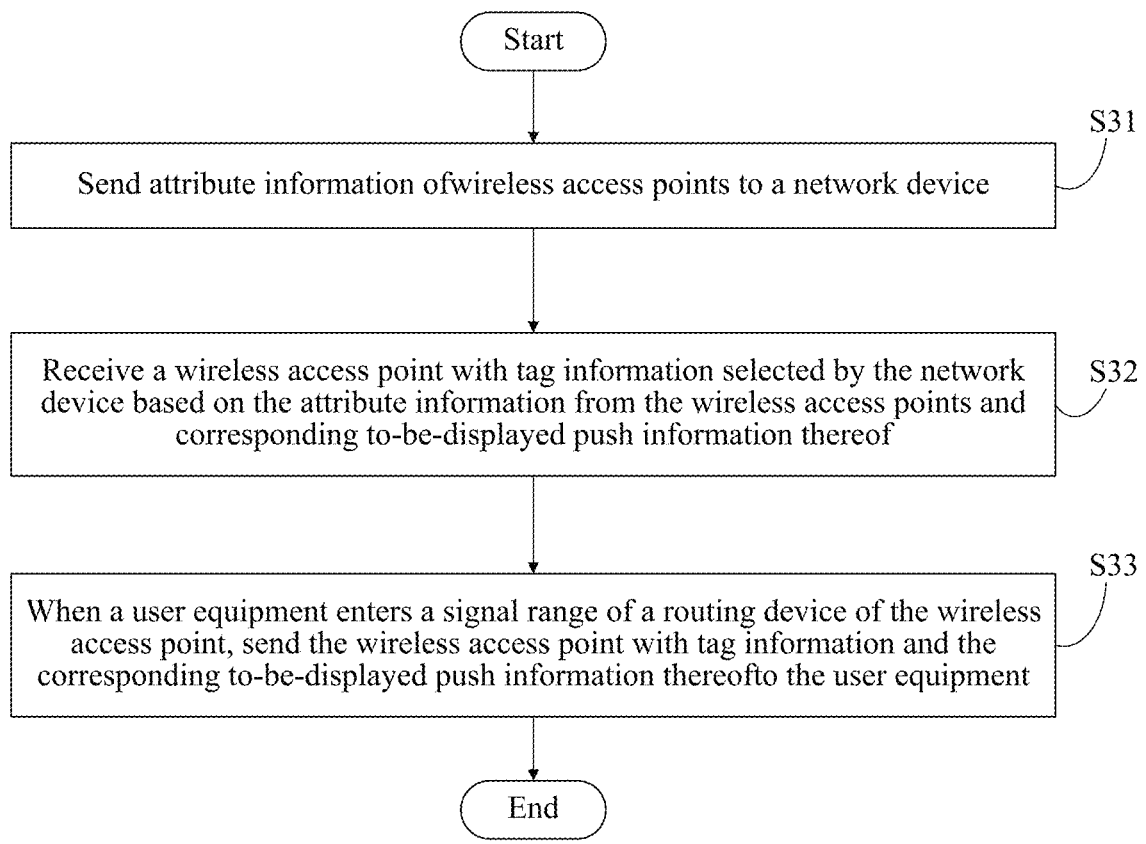
FIG. 6 is a schematic flowchart of a connection establishing method at a routing device side of a wireless access point according to an aspect of the present application.

FIG. 6 is a schematic flowchart of a connection establishing method at a wireless access point according to an aspect of the present application. The method is applied to a routing device side of a wireless access point during establishment of a wireless connection, and includes step S31, step S32, and step S33. When a wireless access point collects attribute information of the wireless access point, in step S31, the attribute information of the wireless access point is sent to a network device, so that the network device selects a preferred wireless access point based on the attribute information of the wireless access point, obtains a wireless access point with tag information and push information to-be-displayed corresponding to the wireless access point, and sends the wireless access point with tag information and the push information to-be-displayed corresponding to the wireless access point to the wireless access point. Next, in step S32, the wireless access point with tag information selected based on the attribute information by the network device from the wireless access points is received, and tag information of the preferred wireless access point is displayed. Then, in step S33, when a user equipment enters a signal range of the routing device of the wireless access point, the wireless access point with tag information and push information to-be-displayed corresponding to the wireless access point are sent to the user equipment, so that the tag information of the wireless access point with tag information is displayed on the user equipment and the corresponding push information to-be-displayed is stored. Therefore, the user equipment may establish a connection to a target wireless access point with tag information based on the tag information, and display the corresponding push information to-be-displayed during establishment of the connection. Therefore, not only costs generated when the user equipment attempts to establish a connection to the wireless access point one by one and costs for trial and error are reduced, but also a success rate of connection between the user equipment and the wireless access point with tag information and connection efficiency are improved. In addition, the corresponding push information to-be-displayed is displayed.

It should be noted that the tag information of the wireless access point with tag information is used to indicate that a connection may be established to the wireless access point free of charge, or that the wireless access point is shared and a connection may be established, or that the wireless access point has a high success rate of connection. The tag information of the wireless access point is obtained at the user equipment side, so that the user equipment may select the target wireless access point with tag information based on the tag information, and rapidly establish a connection to the target wireless access point free of charge, thereby improving a success rate of connection and improving connection efficiency.

Further, the attribute information of the wireless access point includes a name and a physical address of the wireless access point. It should be noted that the attribute information of the wireless access point may include but is not limited to a name (such as a service set identifier (SSID)) and a physical address (such as a media access control MAC address) of a wireless access point. The MAC address may be a BSSID of the wireless access point. Definitely, the attribute information of the wireless access point may also include an encryption type and the like of the wireless access point. Definitely, those skilled in the art shall understand that other existing attribute information or any other future possible attribute information of the wireless access point shall also fall within the protection scope of the present application and be included herein by reference if applicable to the present application.

It should be noted that, the wireless access point with tag information includes a wireless access point that is free of charge, that has a high success rate of connection, or that is allied and requires no access authentication information. The wireless access point with tag information may be a wireless access point that may be allied free of charge or shared for cooperation, and may include but is not limited to a wireless access point that is shared, to which a connection may be established free of charge, or that has a high success rate of connection, so that the user equipment may rapidly establish a connection free of charge without a connection password after scanning a wireless access point with tag information, thereby improving a success rate of connection between the user equipment and the wireless access point with tag information and connection efficiency.

It should be noted that, the push information to-be-displayed may include but is not limited to one or any combination of a text, audio, a video, and a picture. The push information to-be-displayed may be advertisement push information corresponding to a preferred wireless access point, and the advertisement push information may be advertiser information and corresponding advertisement content, etc. The push information to-be-displayed may also be product push information corresponding to the preferred wireless access point, and the product push information may be information of a product brand and information of a product description, etc. The push information to-be-displayed may also be push information of a video such as an advertisement or a film, etc. corresponding to the wireless access point with tag information. Definitely, those skilled in the art shall understand that other existing o-be-displayed push information or any other future possible push information to-be-displayed of the wireless access point shall also fall within the protection scope of the present application and be included herein by reference if applicable to the present application.

It should be noted that, the push information to-be-displayed may include but is not limited to one or any combination of a text, audio, a video, and a picture. The push information to-be-displayed may be advertisement push information corresponding to a preferred wireless access point, and the advertisement push information may be advertiser information and corresponding advertisement content, etc. The push information to-be-displayed may also be product push information corresponding to the preferred wireless access point, and the product push information may be information of a product brand and information of a product description, etc. The push information to-be-displayed may also be push information of a video such as an advertisement or a film, etc. corresponding to the preferred wireless access point. Definitely, those skilled in the art shall understand that other existing o-be-displayed push information or any other future possible push information to-be-displayed of the wireless access point shall also fall within the protection scope of the present application and be included herein by reference if applicable to the present application.

Figure 7:
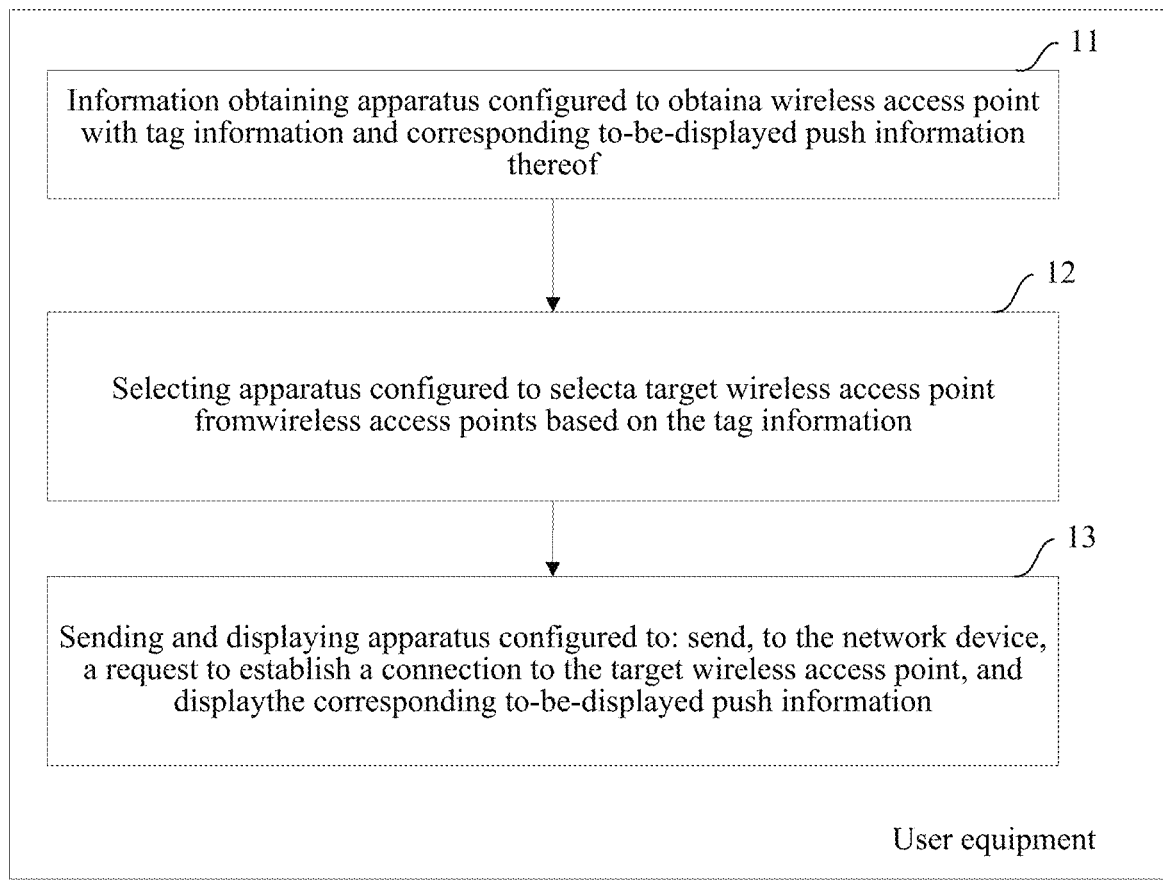
FIG. 7 is a schematic structural diagram of a user equipment for establishing a connection according to an aspect of the present application.

FIG. 7 is a schematic structural diagram of a user equipment for establishing a connection according to an aspect of the present application. The aspect is applied to a user equipment side during establishment of a wireless connection, and the user equipment includes an information obtaining apparatus 11, a selecting apparatus 12, and a sending and displaying apparatus 13.

The information obtaining apparatus 11 is configured to obtain a wireless access point with tag information and push information to-be-displayed corresponding to the wireless access point, where the wireless access point with tag information is selected by a network device from wireless access point(s) scanned by a user equipment according to received attribute information of wireless access points. When the user equipment is to establish a connection to a preferred wireless access point, the selecting apparatus 12 is configured to select a target wireless access point from the wireless access points based on the tag information, and the sending and displaying apparatus 13 is configured to: send, to the network device, a request for establishing a connection to the target wireless access point, and display the corresponding push information to-be-displayed, so that the corresponding push information to-be-displayed may be displayed during establishment of a connection between the user equipment and the target wireless access point, thus relieving anxiety of a user corresponding to the user equipment during waiting and shifting attention from waiting. Afterwards the sending and displaying apparatus 13 is further configured to receive a connection control to the target wireless access point returned by the network device based on the request for establishing a connection, so as to control establishment of a connection between the user equipment and the target wireless access point, thereby completing establishment of a wireless connection between the user equipment and the target wireless access point.

The tag information in the wireless access point with tag information herein is used to indicate that a connection to the wireless access point may be free of charge, or is used to indicate that the wireless access point is in cooperation or alliance with a connection software provider of the wireless access point (which means that access authentication information for establishing a connection is not required), or is used to indicate that a connection to the wireless access point may be established and/or a success rate of establishing a connection to the wireless access point is high. The wireless access point with the foregoing tag information is obtained at the user equipment side, so that a user of the user equipment may select a target wireless access point with tag information based on the tag information. If tag information of the target wireless access point with tag information indicates that a connection to the target wireless access point is free of charge, the user equipment may establish a connection to the target wireless access point free of charge. If the target wireless access point with tag information is in cooperation or alliance with a connection software provider, the user may directly establish a connection to the target wireless access point at the user equipment side without access information for establishing a connection, so that an operation of obtaining the access information is omitted, thereby improving connection efficiency. If the target information of the target wireless access point with tag information is information indicating a high success rate of connection, the user may directly select, at the user equipment side, a target wireless access point with tag information indicating a high success rate of connection, so as to rapidly establish a connection to the target wireless access point with a high success rate of connection, thereby improving a success rate of connection and improve the connection efficiency.

Further, the attribute information of the wireless access point includes a name and a physical address of the wireless access point. It should be noted that the attribute information of the wireless access point may include but is not limited to a name (such as a service set identifier (SSID)) and a physical address (such as a media access control MAC address) of a wireless access point. The MAC address may be a BSSID of the wireless access point. Definitely, the attribute information of the wireless access point may also include an encryption type and the like of the wireless access point. Definitely, those skilled in the art shall understand that other existing attribute information or any other future possible attribute information of the wireless access point shall also fall within the protection scope of the present application and be included herein by reference if applicable to the present application.

It should be noted that the wireless access point with tag information may include a wireless access point to which a connection may be established free of charge, or a wireless access point with a high success rate of connection, or a wireless access point in cooperation or alliance with a connection software provider of the wireless access point and requiring no access authentication information. Therefore, after scanning the wireless access points with tag information, the user equipment may rapidly select, from the displayed wireless access points with tag information based on the tag information, a target wireless access point to which a connection may be established free of charge, a target wireless access point with a high success rate of connection, or a wireless access point in cooperation or alliance with a connection software provider of the wireless access point and requiring no access authentication information, so as to rapidly select a target wireless access point to which a connection needs to be established, thereby improving the connection efficiency.

It should be noted that, the push information to-be-displayed may include but is not limited to one or any combination of a text, audio, a video, and a picture. The push information to-be-displayed may be advertisement push information corresponding to a preferred wireless access point, and the advertisement push information may be advertiser information and corresponding advertisement content, etc. The push information to-be-displayed may also be product push information corresponding to the wireless access point with tag information, and the product push information may be information of a product brand and information of a product description, etc. The push information to-be-displayed may also be push information of a video such as an advertisement or a film, etc. corresponding to the preferred wireless access point. Definitely, those skilled in the art shall understand that other existing o-be-displayed push information or any other future possible push information to-be-displayed of the wireless access point shall also fall within the protection scope of the present application and be included herein by reference if applicable to the present application.

In an embodiment of the present application, when all of the wireless access points obtained by the user equipment have no tag information, push information to-be-displayed corresponding to a preferred wireless access point is not displayed during establishment of a connection between the user equipment and a wireless access point. Instead, locally stored default connection animation information is displayed during establishment of the connection, to notify the user of the user equipment of a current connection progress and a current connection status of a wireless connection between the user equipment and the wireless access point.

Further, the information obtaining apparatus 11 is further configured to send, to the network device, a request for searching a wireless access point with tag information, the request including attribute information of a scanned wireless access point. For example, as shown in FIG. 2, when the user equipment needs to determine a wireless access point with tag information in the wireless access points, the user equipment sends, to the network device using the information obtaining apparatus 11, the request for searching the wireless access point with tag information. The searching request includes the attribute information of the wireless access point scanned by the user equipment, so that the network device obtains, according to the attribute information of the wireless access point in the received searching request, the wireless access point with tag information through matching, thereby sending the wireless access point with tag information and the push information to-be-displayed corresponding to the wireless access point to the user equipment. On one hand, the user equipment receives the wireless access point with tag information and the push information to-be-displayed corresponding to the wireless access point only when sending the searching request to the network device, to reduce processing resources and memory resources for the user equipment to receive and store the wireless access point with tag information and the push information to-be-displayed. On the other hand, the user equipment obtains the scanned wireless access point with tag information and the push information to-be-displayed corresponding to the wireless access point using the information obtaining apparatus 11, so that the user equipment establishes a connection to the target wireless access point using the tag information. The push information to-be-displayed may be further displayed during establishment of the connection, to relieve anxiety of the user of the user equipment during waiting for establishment of the connection.

Further, the information obtaining apparatus 11 is configured to obtain a wireless access point with tag information and push information to-be-displayed corresponding to the wireless access point sent by the network device. For example, in order to ensure that the user equipment can rapidly obtain the tag information of the wireless access point with tag information and establish a connection, when the wireless access point with tag information and the push information to-be-displayed corresponding to the wireless access point are stored at the network device side, the wireless access point with tag information and the push information to-be-displayed corresponding to the wireless access point are delivered to the user equipment. Afterwards, the user equipment obtains, using the information obtaining apparatus 11, a wireless access point with tag information and push information to-be-displayed corresponding to the wireless access point delivered by the network device. As shown in FIG. 2, the tag information may represent that the wireless access point with tag information to which the tag information belongs may be shared or a connection may be established free of charge. A wireless access point modou_ceshi in FIG. 2 is the wireless access point with tag information. The tag information of the wireless access point with tag information is reflected using an alliance tag, helping the user equipment to rapidly establish, free of charge based on the tag information (for example, the alliance tag), a connection to the selected target wireless access point (modou_ceshi) to which a connection needs to be established, which is shown in FIG. 4. Not only a success rate of a connection to the target wireless access point is ensured, but also the corresponding push information to-be-displayed (for example, an advertisement related to modou_ceshi) is displayed to relieve anxiety of the user of the user equipment during waiting, thereby improving user experience.

Further, the information obtaining apparatus 11 is configured to obtain a wireless access point with tag information and push information to-be-displayed corresponding to the wireless access point sent by a routing device of the wireless access point, the wireless access point with tag information and the push information to-be-displayed corresponding to the wireless access point being obtained by the wireless access point from the network device. For example, if the wireless access point with tag information and the corresponding push information to-be-displayed are pre-sent to the routing device of the wireless access point, after the user equipment enters a signal range of the routing device of the wireless access point, the wireless access point sends, to the user equipment, all wireless access points with tag information and corresponding push information to-be-displayed. Afterwards, the information obtaining apparatus 11 may perform scanning, so that sending, to the network device, of a request for searching a preferred wireless access point is omitted. Therefore, not only resources consumed for a processing procedure of sending the searching request are reduced, a wireless connection point with tag information to which a connection needs to be established is rapidly selected based on the wireless access point with tag information sent by the wireless access point, so as to establish a connection. In addition, corresponding push information to-be-displayed (for example, advertisement content corresponding to the wireless access point with tag information) may be further displayed during establishment of the connection.

Further, for the sending and displaying apparatus 13 sending, to the network device, a request for establishing a connection to the target wireless access point, the request for establishing the connection includes attribute information of the user equipment.

For the sending and displaying apparatus 13 further configured to receive a connection control to the target wireless access point returned by the network device based on the request for establishing a connection, the connection control is obtained by the user equipment through verification on the attribute information of the user equipment.

It should be noted that, the attribute information of the user equipment is information for connection determining included in a request for establishing a connection to the target wireless access point with an alliance tag, and may include but is not limited to a user identifier (that is, a user ID), an equipment identifier (that is, an equipment ID) of the user equipment, and content of a connection protocol for connection, etc. The attribute information of the user equipment is used to uniquely indicate an identity of the user equipment, so that the network device verifies an identity of the user according to the received attribution information of the user equipment, thereby ensuring validity and safety of the identity of the user equipment for establishing a connection.

In an embodiment of the present application, as shown in FIG. 3, the user equipment selects a target wireless access point (for example, modou_ceshi) based on the tag information (for example, an alliance table tag) using the selecting apparatus 12, and sends, to the network device, a request for establishing a connection to the target wireless access point (for example, modou_ceshi). The request for establishing a connection includes attribute information (such as a user ID or an equipment ID) of the user equipment. After the user of the user equipment taps key connect under the target wireless access point (for example, modou_ceshi) in FIG. 3, the user equipment obtains the request for establishing a connection to the target wireless access point (for example, modou_ceshi) sent to the network device, so that the network device verifies an identity of the user equipment based on the attribute information of the user equipment, and sends a connection control obtained after identity verification to the user equipment, which is shown in FIG. 4. In this case, the sending and displaying apparatus 13 receives a connection control to the target wireless access point returned by the network device based on the request for establishing a connection, to control establishment of a connection between the user equipment and a preferred wireless access point, thereby preventing an unauthorized user from establishing a connection to the target wireless access point free of charge and ensuring safety.

Further, if the selected target wireless access point is a wireless access point with tag information to which a connection may be established free of charge without verification on the identity of the user equipment, for the sending and displaying apparatus 13 sending, to the network device, a request for establishing a connection to the target wireless access point, the request for establishing a connection includes access authentication information of the target wireless access point; and for the receiving a connection control to the target wireless access point returned by the network device based on the request for establishing a connection, the connection control is obtained by the network device through verification on the access authentication information of the target wireless access point.

It should be noted that the access authentication information of the target wireless access point may include but is not limited to an access password, an access verification identification code, and an access verification token, etc., so that a valid wireless connection to the target wireless access point is allowed after verification performed by the network device on the access authentication information succeeds, thereby ensuring safety and validity of a connection to a target wireless access point that is established free of charge without verification on the identity of the user equipment.

Further, the sending and displaying apparatus 13 is configured to:

if verification performed by the network device succeeds, receive a control of establishing a connection to the target wireless access point returned by the network device based on the request for establishing a connection; or if verification performed by the network device fails, receive a control of prohibiting establishment of a connection to the target wireless access point returned by the network device.

In an embodiment of the present application, during establishment of the connection between the user equipment and the target wireless access point, after identity verification on the attribute information of the user equipment in the request for establishing a connection sent by the network device to the user equipment succeeds, or verification on the access authentication information of the target wireless access point succeeds, the network device returns, to the user equipment, a control of establishing a connection to the target wireless access point. After the user equipment receives, using the sending and displaying apparatus 13, the control of establishing a connection to the target wireless access point returned by the network device, establishment of a wireless connection between the user equipment and the target wireless access point is controlled through the control of establishing a connection. If identity verification on the attribute information of the user equipment in the request for establishing a connection sent by the network device to the user equipment fails, the network device returns, to the user equipment, the control of prohibiting establishment of a connection to the target wireless access point. After the user equipment receives, using the sending and displaying apparatus 13, the control of prohibiting establishment of a connection to the target wireless access point returned by the user equipment, establishment of a wireless connection between the user equipment and the target wireless access point is prohibited through the control of prohibiting establishment of a connection. Therefore, not only a wireless connection is established between a verified user equipment and the target wireless access point, but also an unverified unauthorized user equipment is prevented from establishing a wireless connection to the target wireless access point, thereby ensuring safety of the target wireless access point that may be shared or to which a wireless connection may be established free of charge.

Further, the sending and displaying apparatus 13 is further configured to:

receive, from the network device, information of successful establishment of a connection to the target wireless access point; and after or during the receiving a control of prohibiting establishment of a connection to the target wireless access point returned by the network device, the sending and displaying apparatus is further configured to:

receive, from the network device, information of unsuccessful establishment of a connection to the target wireless access point.

In an embodiment of the present application, after or during returning of the control of establishing a connection to the target wireless access point to the user equipment performed by the network device, in order to help the user of the user equipment learn in real time whether a connection between the user equipment and the target wireless access point is successful, the user equipment further receives, from the network device, information of successful establishment of a connection to the target wireless access point, so as to notify the user of the user equipment of successful establishment of a connection between the user equipment and the target wireless access point. After or during returning of the control of prohibiting establishment of a connection to the target wireless access point to the user equipment performed by the network device, information of unsuccessful establishment of a connection to the target wireless access point is further received from the network device, so as to notify the user of the user equipment of unsuccessful connection of a connection between the user equipment and the target wireless access point, so that the user equipment can rapidly establish a connection to other wireless access points with tag information that may be shared or to which a connection may be established free of charge.

Further, the information obtaining apparatus 11 is further configured to display the preferred wireless access point and corresponding tag information. For example, after the user equipment 11 obtains tag information of a wireless access point with tag information using the information obtaining apparatus, as shown in FIG. 2, the wireless access point with tag information and the corresponding tag information are displayed, so that the user of the user equipment can rapidly see tag information used to indicate sharing free of charge or a high success rate of connection, and can rapidly identify the wireless access point with tag information and rapidly establish a connection to the wireless access point. Therefore, not only costs generated when the user blindly attempts to establish a connection one by one and costs for trial and error can be reduced, but also a success rate of establishing a connection between the user equipment and the preferred wireless access point with tag information and efficiency of connection establishment can be improved.

Figure 8:
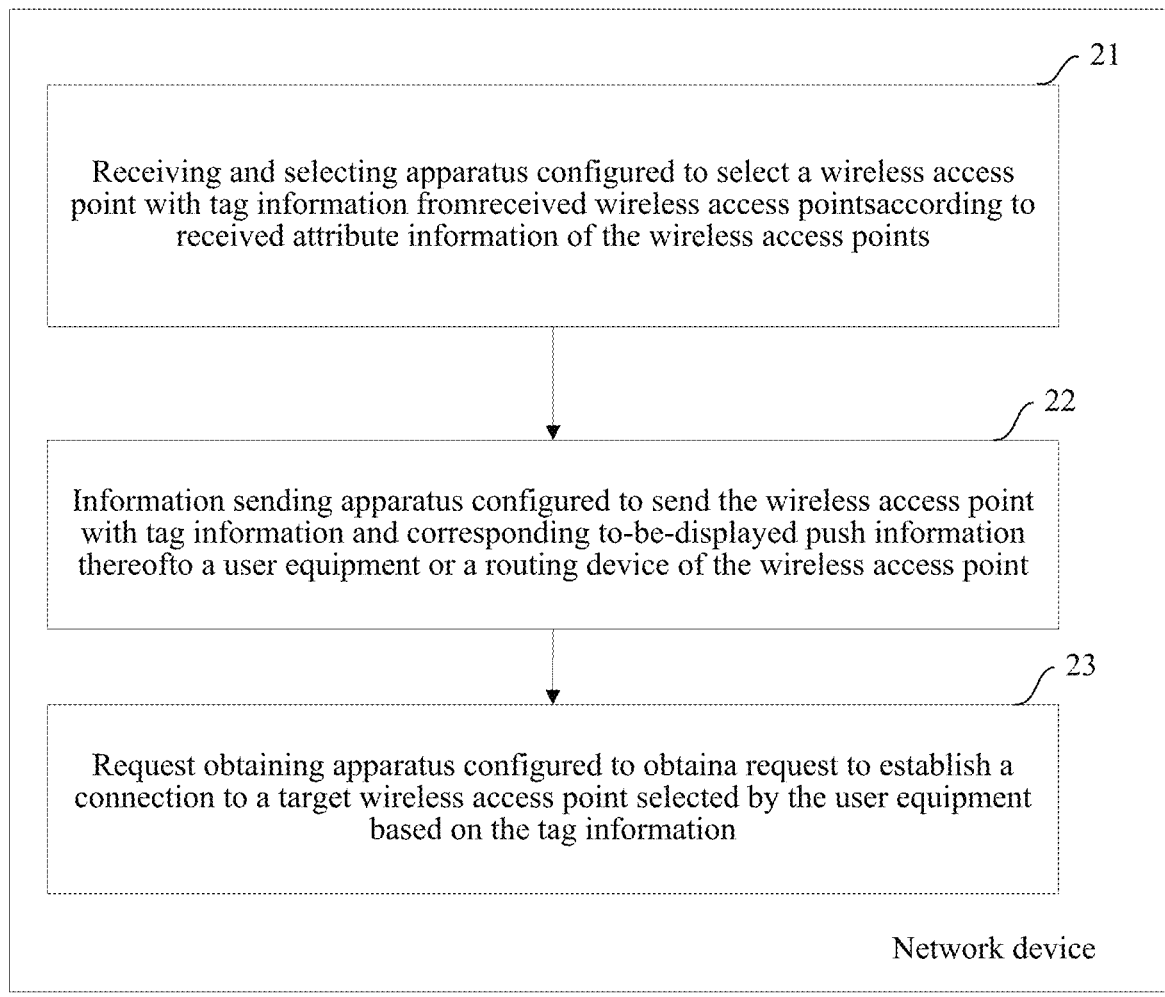
FIG. 8 is a schematic structural diagram of a network device for establishing connection according to another aspect of the present application.

FIG. 8 is a schematic structural diagram of a network device for establishing a connection according to another aspect of the present application. The aspect is applied to a network device side during establishment of a wireless connection, and the network device includes a receiving and selecting apparatus 21, an information sending apparatus 22, and a request obtaining apparatus 23.

The receiving and selecting apparatus 21 is configured to select a wireless access point with tag information from received wireless access points according to received attribute information of the wireless access points. The information sending apparatus 22 is configured to send the wireless access point with tag information and push information to-be-displayed corresponding to the wireless access point to a user equipment or a routing device of the wireless access point, so that the user equipment can rapidly obtain the tag information of the wireless access point with tag information and the push information to-be-displayed, or can rapidly obtain the tag information of the wireless access point with tag information and the push information to-be-displayed sent by the wireless access point when entering a signal range of the routing device side of the wireless access point with tag information. Next, the request obtaining apparatus 23 is configured to: obtain a request for establishing a connection to a preferred wireless access point selected by the user equipment based on the tag information. Afterwards, the request obtaining apparatus 23 is further configured to return, to the user equipment based on the request for establishing a connection, a connection control to the target wireless access point, so as to control establishment of the connection between the user equipment and the target wireless access point, so that not only the network device sends the wireless access point with tag information and the corresponding push information to-be-displayed to the user equipment, but also establishment of the connection between the user equipment and the target wireless access point is controlled using the obtained request for establishing a connection sent by the user equipment.

It should be noted that the tag information of the wireless access point with tag information is used to indicate that a connection may be established to the wireless access point with tag information free of charge, or that the wireless access point is shared and a connection may be established, or that the wireless access point has a high success rate of connection. The tag information of the wireless access point is obtained at the user equipment side, so that the user equipment may select the target wireless access point with tag information based on the tag information, and rapidly establish a connection to the target wireless access point free of charge, thereby improving a success rate of connection and improving connection efficiency.

Further, the attribute information of the wireless access point includes a name and a physical address of the wireless access point. It should be noted that the attribute information of the wireless access point may include but is not limited to a name (such as a service set identifier (SSID)) and a physical address (such as a media access control MAC address) of a wireless access point. The MAC address may be a BSSID of the wireless access point. Definitely, the attribute information of the wireless access point may also include an encryption type and the like of the wireless access point. Definitely, those skilled in the art shall understand that other existing attribute information or any other future possible attribute information of the wireless access point shall also fall within the protection scope of the present application and be included herein by reference if applicable to the present application.

It should be noted that, the wireless access point with tag information includes a wireless access point that is free of charge, that has a high success rate of connection, or that is allied and requires no access authentication information. The preferred wireless access point may be a wireless access point that may be allied free of charge or shared for cooperation, and may include but is not limited to a wireless access point that is shared, to which a connection may be established free of charge, or that has a high success rate of connection, so that the user equipment may rapidly establish a connection free of charge without a connection password after scanning a wireless access point with tag information, thereby improving a success rate of connection between the user equipment and the wireless access point with tag information and connection efficiency.

It should be noted that, the push information to-be-displayed may include but is not limited to one or any combination of a text, audio, a video, and a picture. The push information to-be-displayed may be advertisement push information corresponding to a preferred wireless access point, and the advertisement push information may be advertiser information and corresponding advertisement content, etc. The push information to-be-displayed may also be product push information corresponding to the wireless access point with tag information, and the product push information may be information of a product brand and information of a product description, etc. The push information to-be-displayed may also be push information of a video such as an advertisement or a film, etc. corresponding to the preferred wireless access point. Definitely, those skilled in the art shall understand that other existing o-be-displayed push information or any other future possible push information to-be-displayed of the wireless access point shall also fall within the protection scope of the present application and be included herein by reference if applicable to the present application.

Further, the receiving and selecting apparatus 21 is further configured to receive, from the user equipment, a request for searching a wireless access point with tag information, the request including attribute information of a scanned wireless access point. For example, when the user equipment needs to establish a connection to a wireless connection point that is free of charge or that has a high success rate of connection but does not know a wireless access point with tag information that is free of charge or that has a high success rate of connection, the user equipment sends a searching request to the network device. In this case, the network device receives, from the user equipment using the receiving and selecting apparatus 21, a request for searching a wireless access point with tag information. The searching request includes attribute information of all scanned wireless access points. Next, the receiving and selecting apparatus 21 selects a preferred wireless access point to which a connection may be established free of charge or that has a high success rate of connection from all of the wireless access points according to received attribute information of the wireless access points scanned by the user equipment, and then the wireless access point with tag information and corresponding push information to-be-displayed are sent to the user equipment. Therefore, screening is performed on all of the wireless access points scanned by the user equipment, and the selected wireless access point with tag information and the corresponding push information to-be-displayed are sent to the user equipment, so that the user equipment can rapidly establish a connection to the target wireless access point based on the tag information, and display the push information to-be-displayed.

Further, the receiving and selecting apparatus 21 is further configured to receive the attribute information of the wireless access point from the routing device of the wireless access point. For example, when the wireless access point with tag information needs to be marked, the wireless access point sends attribute information corresponding to the wireless access point to the network device, so that the network device selects the wireless access point with tag information according to the attribute information of the wireless access point received by the receiving and selecting apparatus 21. In other words, when the wireless access points received by the receiving and selecting apparatus 21 include wireless access points: three TP-Link_F2A123 and modou_ceshi in FIG. 2, screening is performed on the wireless access points according to attribute information of the wireless access points (such as a name and a corresponding physical address, etc. of the wireless access point), to obtain a selected wireless access point modou_ceshi with tag information, so that the network device directly obtains attribute information corresponding to the wireless access point from the wireless access point.

Further, the receiving and selecting apparatus 21 is configured to: determine whether the name and physical address of the wireless access point match the name and the physical address of a wireless access point in a database; and if match, use the wireless access point as a selected target wireless access point.

In an embodiment of the present application, in order to select, mark, and display a wireless access point with tag information to which a connection may be established free of charge or that has a high success rate of connection, after the network device receives the attribute information of the wireless access point (such as a name (SSID) and a physical address (BSSID) of the wireless access point), the receiving and selecting apparatus 21 determines whether the name (SSID) and the physical address (BSSID) of the wireless access point match the name and the physical address of wireless access point in the database of the network device. If there is a matched name and a matched physical address of the wireless access point, the wireless access point is used as a selected wireless access point with tag information, and tag information (an alliance tag) of the wireless access point with tag information and corresponding push information to-be-displayed (for example, corresponding advertisement content) are sent to the user equipment, to screen the wireless access points in the network device, and the selected wireless access point is determined as a wireless access point with tag information, so that the user equipment may establish a connection to the preferred wireless access point at a high success rate based on the tag information of the wireless access point with tag information, and display push information to-be-displayed corresponding to the wireless access point.

In order to ensure safety of the preferred wireless access point to which a connection may be established free of charge or that has a high success rate of connection and the push information to-be-displayed corresponding to the wireless access point, if the selected target wireless access point is an allied wireless access point with tag information requiring no access authentication information, the request for establishing a connection to a target wireless access point selected by the user equipment based on the tag information obtained by the information obtaining apparatus 22 includes attribute information of the user equipment (such as an equipment ID or a user ID of the user equipment) and the request obtaining apparatus 23 is configured to: verify the attribute information of the user equipment, return, to the user equipment, the connection control to the target wireless access point according to a verification result, so that the network device controls establishment of a connection between the user equipment and the target wireless access point with tag information, that is, the network device verifies validity of the attribute information of the user equipment, thereby preventing an unauthorized user from establishing a connection to the wireless access point with tag information to which a connection may be established free of charge or that has a high success rate of connection, and ensuring safety of the connection to the target wireless access point with tag information and safety of the push information to-be-displayed corresponding to the wireless access point.

Following the foregoing embodiment of the present application, if the selected target wireless access point is the wireless access point with tag information to which a connection may be established free of charge and requiring no verification on an identity of the user equipment, for the receiving and selecting apparatus 21 configured to obtain a request for establishing a connection to the target wireless access point selected by the user equipment based on the tag information, the request for establishing a connection includes access authentication information of the target wireless access point; and the returning, to the user equipment based on the request for establishing a connection, a connection control to the target wireless access point includes:

verifying the access authentication information of the target wireless access point, and returning, to the user equipment according to a verification result, the connection control to the target wireless access point.

It should be noted that the access authentication information of the target wireless access point may include but is not limited to an access password, an access verification identification code, and an access verification token, etc., so that a valid wireless connection to the target wireless access point is allowed after verification performed by the network device on the access authentication information succeeds, thereby ensuring safety and validity of a connection to a target wireless access point that is established free of charge without verification on the identity of the user equipment.

Further, the request obtaining apparatus 23 is configured to:

if verification succeeds, return, to the user equipment, a control of establishing a connection to the target wireless access point; or if verification fails, return, to the user equipment, a control of prohibiting establishment of a connection to the target wireless access point.

In an embodiment of the present application, during establishment of a connection between the user equipment and the target wireless access point, in order to ensure safety of the wireless access point with tag information and the corresponding push information to-be-displayed, the attribute information of the user equipment is judged or the access authentication information of the target wireless access point is verified. If identity verification performed by the network device on the attribute information of the user equipment in the request for establishing a connection sent by the user equipment succeeds, or verification on the access authentication information of the target wireless access point succeeds, the request obtaining apparatus 23 returns, to the user equipment, a control of establishing a connection to the target wireless access point, so that the user equipment controls establishment of a wireless connection between the user equipment and the target wireless access point through the control of establishing a connection. If identity verification performed by the network device on the attribute information of the user equipment in the request for establishing a connection sent by the user equipment fails, or verification on the access authentication information of the target wireless access point fails, the request obtaining apparatus 23 returns, to the user equipment, the control of prohibiting establishment of a connection to the target wireless access point, so that the user equipment is prohibited from establishing a wireless connection to the target wireless access point through the control of prohibiting establishment of a connection. Therefore, not only a wireless connection is established between a verified user equipment and the target wireless access point, and an unverified unauthorized user equipment is prevented from establishing a connection to the target wireless access point. Alternatively, an unauthorized user and an unauthorized competitor are prevented from establishing a connection to a preferred wireless access point free of charge, using the wireless access point, and obtaining corresponding push information to-be-displayed after cracking the preferred wireless access point through an application (APP), so that the target wireless access point to which a wireless connection may be established free of charge or shared and corresponding push information to-be-displayed are safely protected.

Further, the request obtaining apparatus 23 is further configured to:

send, to the user equipment, information of successful establishment of a connection to the target wireless access point; or send, to the user equipment, information of unsuccessful establishment of a connection to the target wireless access point.

In an embodiment of the present application, after or during returning of the control of establishing a connection to the target wireless access point to the user equipment performed by the network device using the request obtaining apparatus 23, in order notify a user of the user equipment of successful establishment of a connection, the request obtaining apparatus 23 further sends, to the user equipment, the information of successful establishment of a connection to the target wireless access point, so that the user of the user equipment can learn that a connection is successfully established between the user equipment and the target wireless access point. After or during returning of the control of prohibiting establishment of a connection to the target wireless access point to the user equipment performed by the network device using the request obtaining apparatus 23, in order to notify the user of the user equipment of unsuccessful establishment of a connection such that the user equipment attempts other preferred wireless access points to which a connection may be established free of charge or that have a high success rate of connection, the request obtaining apparatus 23 further sends, to the user equipment, the information of unsuccessful establishment of a connection to the target wireless access point, to notify the user of the user equipment of a result of unsuccessful establishment of a connection to the target wireless access point, so that the user equipment attempts to establish a connection to other preferred wireless access points to which a connection may be established free of charge or that have a high success rate of connection.

Figure 9:
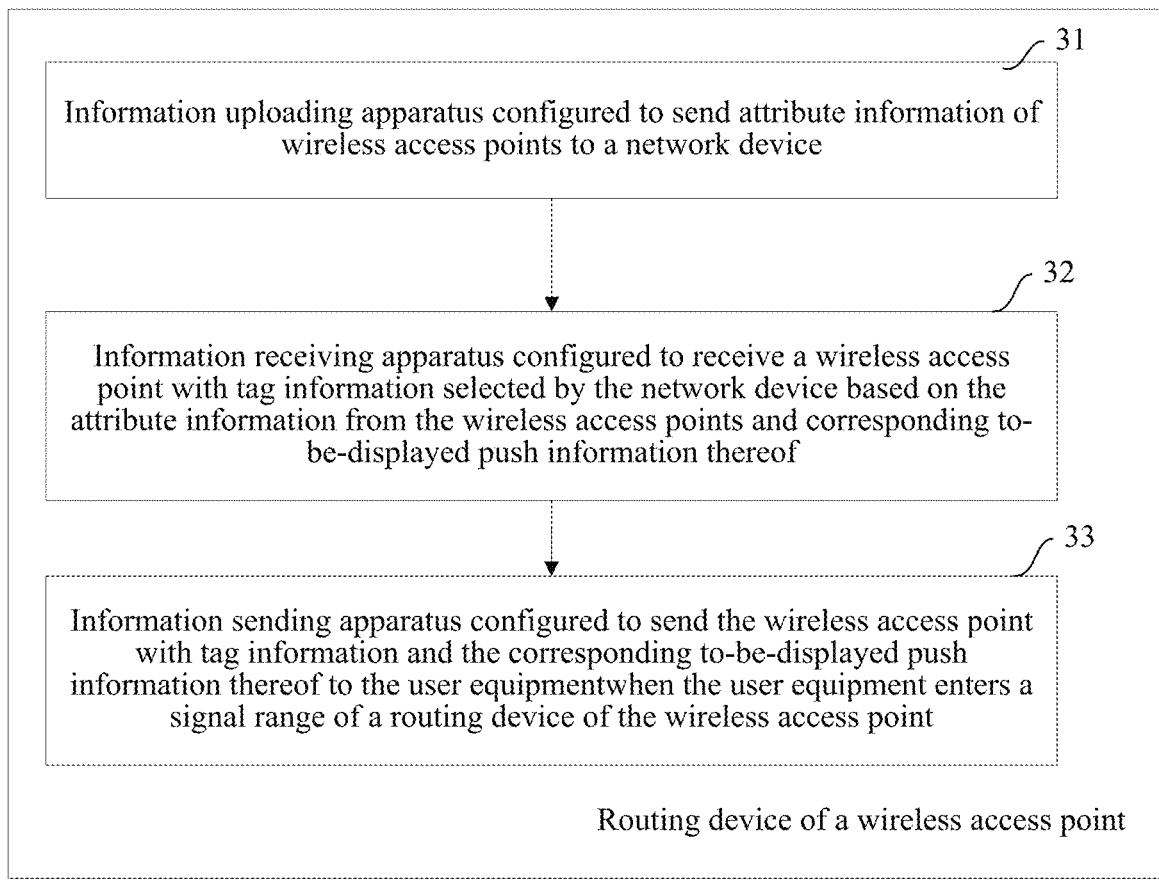
FIG. 9 is a schematic structural diagram of a routing device of a wireless access point for establishing connection according to an aspect of the present application.

FIG. 9 is a schematic structural diagram of a routing device of a wireless access point for establishing a connection according to an aspect of the present application. The aspect is applied to a routing device side of a wireless access point during establishment of a wireless connection, and the routing device includes an information uploading apparatus 31, an information receiving apparatus 32, and an information delivering apparatus 33. When a wireless access point collects attribute information of the wireless access point, the information uploading apparatus 31 is configured to send attribute information of wireless access points to a network device, so that the network device selects a preferred wireless access point based on the attribute information of the wireless access point, obtains a wireless access point with tag information and push information to-be-displayed corresponding to the wireless access point, and sends to the wireless access point the wireless access point with tag information and the push information to-be-displayed corresponding to the wireless access point to the wireless access point. Next, the information receiving apparatus 32 is configured to: receive a wireless access point with tag information selected by the network device based on the attribute information from the wireless access points and push information to-be-displayed corresponding to the wireless access point, and display the tag information of the preferred wireless access point. Then, the information delivering apparatus 33 is configured to: when a user equipment enters a signal range of a routing device of the wireless access point, send the wireless access point with tag information and the push information to-be-displayed corresponding to the wireless access point to the user equipment, so that the tag information of the preferred wireless access point is displayed in the user equipment and the corresponding push information to-be-displayed is stored. Therefore, the user equipment may establish a connection to the preferred wireless access point based on the tag information, and display the corresponding push information to-be-displayed during establishment of the connection. Therefore, not only costs generated when the user equipment attempts to establish a connection to the wireless access point one by one and costs for trial and error are reduced, but also a success rate of connection between the user equipment and the preferred wireless access point and connection efficiency are improved. In addition, the corresponding push information to-be-displayed is displayed.

It should be noted that the tag information of the wireless access point with tag information is used to indicate that a connection may be established to the wireless access point free of charge, or that the wireless access point is shared and a connection may be established, or that the wireless access point has a high success rate of connection. The tag information of the wireless access point is obtained at the user equipment side, so that the user equipment may select the target wireless access point with tag information based on the tag information, and rapidly establish a connection to the target wireless access point free of charge, thereby improving a success rate of connection and improving connection efficiency.

Further, the attribute information of the wireless access point includes a name and a physical address of the wireless access point. It should be noted that the attribute information of the wireless access point may include but is not limited to a name (such as a service set identifier (SSID)) and a physical address (such as a media access control MAC address) of a wireless access point. The MAC address may be a BSSID of the wireless access point. Definitely, the attribute information of the wireless access point may also include an encryption type and the like of the wireless access point. Definitely, those skilled in the art shall understand that other existing attribute information or any other future possible attribute information of the wireless access point shall also fall within the protection scope of the present application and be included herein by reference if applicable to the present application.

It should be noted that, the wireless access point with tag information includes a wireless access point that is free of charge, that has a high success rate of connection, or that is allied and requires no access authentication information. The wireless access point with tag information may be a wireless access point that may be allied free of charge or shared for cooperation, and may include but is not limited to a wireless access point that is shared, to which a connection may be established free of charge, or that has a high success rate of connection, so that the user equipment may rapidly establish a connection free of charge without a connection password after scanning a wireless access point with tag information, thereby improving a success rate of connection between the user equipment and the wireless access point with tag information and connection efficiency.

It should be noted that, the push information to-be-displayed may include but is not limited to one or any combination of a text, audio, a video, and a picture. The push information to-be-displayed may be advertisement push information corresponding to a preferred wireless access point, and the advertisement push information may be advertiser information and corresponding advertisement content, etc. The push information to-be-displayed may also be product push information corresponding to the preferred wireless access point, and the product push information may be information of a product brand and information of a product description, etc. The push information to-be-displayed may also be push information of a video such as an advertisement or a film, etc. corresponding to the wireless access point with tag information. Definitely, those skilled in the art shall understand that other existing o-be-displayed push information or any other future possible push information to-be-displayed of the wireless access point shall also fall within the protection scope of the present application and be included herein by reference if applicable to the present application.

In summary, according to the present application, the wireless access point with tag information and the push information to-be-displayed corresponding to the wireless access point are obtained at the user equipment side, where the wireless access point with tag information is selected by a network device from wireless access point(s) scanned by a user equipment according to the received attribute information of the wireless access points; when the user equipment is to establish a connection to the wireless access point with tag information, the target wireless access point is selected based on the tag information from the wireless access points, and the request for establishing a connection to the target wireless access point is sent to the network device, and the corresponding push information to-be-displayed is displayed, so that not only a success rate of connection is ensured, but also the corresponding push information to-be-displayed may be displayed during establishment of a connection between the user equipment and the target wireless access point, thus relieving anxiety of a user corresponding to the user equipment during waiting and shifting attention from waiting; and a connection control to the target wireless access point returned by the network device based on the request for establishing a connection is received, so as to control establishment of connection between the user equipment and the target wireless access point.

Further, according to the present application, the wireless access point with tag information is selected from the received wireless access points at the network device side according to the received attribute information of the wireless access points, and the selected wireless access point with tag information and the push information to-be-displayed corresponding to the wireless access point are sent to the user equipment or the routing device of the wireless access point, so that the user equipment can rapidly obtain the tag information of the preferred wireless access point and the push information to-be-displayed, or can rapidly obtain the tag information of the preferred wireless access point sent by the wireless access point and the push information to-be-displayed when entering the signal range of a routing device of the preferred wireless access point; next, the network device obtains the request for establishing a connection to the target wireless access point selected by the user equipment based on the tag information; and then the connection control to the target wireless access point is returned to the user equipment based on the request for establishing a connection, so as to control the connection between the user equipment and the target wireless access point.

Further, according to the present application, the attribute information of the wireless access point is sent to the network device at the routing device side of the wireless access point; the wireless access point with tag information selected by the network device based on the attribute information from the wireless access points and the corresponding push information to-be-displayed are received, so that the wireless access point with tag information and the corresponding push information to-be-displayed are sent to the user equipment when the user equipment enters the signal range of the wireless access point, and the user equipment can rapidly obtain the tag information of the preferred wireless access point when entering the signal range of the routing device of the wireless access point, and can rapidly establish a connection to the target wireless access point based on the tag information, and the user equipment displays the corresponding push information to-be-displayed when a connection is established. The present application further provides a calculation-based device, including:

a processor; and a memory configured to store a computer executable instruction that, when executed, causes the processor to obtain a wireless access point with tag information and push information to-be-displayed corresponding to the wireless access point, where the wireless access point with tag information is selected by a network device from wireless access point(s) scanned by a user equipment according to received attribute information of wireless access points;

select a target wireless access point from the wireless access points based on the tag information; and send, to the network device, a request for establishing a connection to the target wireless access point, and display the corresponding push information to-be-displayed.

A calculation-based device, including:

a processor; and a memory configured to store a computer executable instruction that, when executed, causes the processor to select a wireless access point with tag information from received wireless access points according to received attribute information of the wireless access points;

send the wireless access point with tag information and push information to-be-displayed corresponding to the wireless access point to a user equipment or a routing device of the wireless access point; and obtain a request for establishing a connection to a target wireless access point selected by the user equipment based on the tag information.

A calculation-based device, including:

a processor; and a memory configured to store a computer executable instruction that, when executed, causes the processor to send attribute information of wireless access points to a network device;

receive a wireless access point with tag information selected by the network device based on the attribute information from the wireless access points and push information to-be-displayed corresponding to the wireless access point; and when a user equipment enters a signal range of a routing device of the wireless access point, send, to the user equipment, the wireless access point with tag information and the push information to-be-displayed corresponding to the wireless access point.

It should be noted that, this application may be implemented in software and/or a combination of software and hardware, for example, may be implemented by using an application-specific integrated circuit (ASIC), a general purpose computer, or any other similar hardware device. In an embodiment, the software program in this application may be executed by using a processor to implement the foregoing steps or functions. Similarly, a software program (including a related data structure) in this application may be stored in a computer-readable recording medium such as a RANI, a magnetic or optical drive, a floppy disk, or other similar device. In addition, some steps or functions of this application may be implemented by using hardware, for example, a circuit that is used in combination with a processor to perform various steps or functions.

In addition, some of this application may be applied to a computer program product, for example, a computer program instruction. When the computer program instruction is executed by a computer, the computer is caused to operate to invoke or provide the method and/or the technical solution according to this application. A program instruction for calling the method of this application may be stored in a fixed or removable recording medium, and/or transmitted via a data stream in a broadcast or other signal bearing medium, and/or stored in a working memory of a computer device that runs according to the program instruction. Herein, an embodiment according to this application includes an apparatus. The apparatus includes a memory configured to store a computer program instruction and a processor configured to execute the program instruction. When the computer program instruction is executed by the processor, the apparatus is triggered to run the method and/or the technical solution according to the embodiments of this application.

It is apparent to a person skilled in the art that this application is not limited to details in the foregoing exemplary embodiments, and this application can be implemented in another specific form without departing from the spirit or basic features of this application. Therefore, the embodiments should be considered to be exemplary in all respects and not limitative. The scope of this application is not defined by the foregoing description but by the appended claims. This application is intended to include all the variations that are equivalent in significance and scope to the claims. No reference numerals in the claims should be considered as limitations to the related claims. In addition, the term "include" apparently does not exclude other units or steps, and a singular form does not exclude a plural form. Multiple units or apparatuses recited in an apparatus claim may also be implemented by one unit or apparatus through software or hardware. Terms such as "first" and "second" are used to indicate names, but do not indicate any particular sequence.

What is claimed is:

1. A connection establishing method at a user equipment, comprising:

obtaining a wireless access point with tag information and push information to-be-displayed corresponding to the wireless access point, wherein the wireless access point with the tag information is selected by a network device from a plurality of wireless access points scanned by the user equipment according to attribute information of the wireless access point;

selecting a target wireless access point from the plurality of wireless access points based on the tag information; and sending, to the network device, a request for establishing a connection to the target wireless access point, and displaying the push information to-be-displayed;

receiving a connection control to the target wireless access point returned by the network device based on the request for establishing the connection.

2. The connection establishing method according to claim 1, wherein, before the step of obtaining the wireless access point with the tag information and the push information to-be-displayed corresponding to the wireless access point, the connection establishing method further comprises:

sending, to the network device, a request for searching the wireless access point with the tag information, wherein the request comprises the attribute information of the wireless access point.

3. The connection establishing method according to claim 1, wherein, the wireless access point with the tag information and the push information to-be-displayed corresponding to the wireless access point are sent by the network device.

4. The connection establishing method according to claim 1, wherein, the step of obtaining the wireless access point with the tag information and the push information to-be-displayed corresponding to the wireless access point comprises:

obtaining the wireless access point with the tag information and the push information to-be-displayed corresponding to the wireless access point sent by a routing device of the wireless access point, the wireless access point with the tag information and the push information to-be-displayed corresponding to the wireless access point are obtained by the routing device of the wireless access point from the network device.

5. The connection establishing method according to claim 1, wherein, the request for establishing the connection comprises attribute information of the user equipment; and the connection control is obtained by the network device through verification on the attribute information of the user equipment.

6. The connection establishing method according to claim 5, wherein the step of receiving the connection control to the target wireless access point returned by the network device based on the request for establishing the connection comprises:

receiving a control of establishing the connection to the target wireless access point returned by the network device based on the request for establishing the connection when verification performed by the network device succeeds; or receiving a control of a prohibiting establishment of the connection to the target wireless access point returned by the network device when the verification performed by the network device fails.

7. The connection establishing method according to claim 6, wherein after or during the step of receiving the control of establishing the connection to the target wireless access point returned by the network device, the connection establishing method further comprises:

receiving, from the network device, information of a successful establishment of the connection to the target wireless access point; and after or during the step of receiving the control of the prohibiting establishment of the connection to the target wireless access point returned by the network device, the connection establishing method further comprises:

receiving, from the network device, information of an unsuccessful establishment of the connection to the target wireless access point.

8. The connection establishing method according to claim 1, wherein the request for establishing the connection comprises access authentication information of the target wireless access point; and the connection control is obtained by the network device through verification on the access authentication information of the target wireless access point.

9. A connection establishing method at a network device, comprising:

selecting a wireless access point with tag information from a plurality of wireless access points according to attribute information of the wireless access point;

sending the wireless access point with the tag information and push information to-be-displayed corresponding to the wireless access point to a user equipment or a routing device of the wireless access point; and obtaining a request for establishing a connection to a target wireless access point selected by the user equipment based on the tag information;

returning, to the user equipment based on the request for establishing the connection, a connection control to the target wireless access point.

10. The connection establishing method according to claim 9, wherein, before the step of selecting the wireless access point with the tag information from the plurality of wireless access points according to the attribute information of the wireless access point, the connection establishing method further comprises:

receiving, from the user equipment, a request for searching the wireless access point with the tag information, wherein the request comprises the attribute information of the wireless access point.

11. The connection establishing method according to claim 9, wherein, before the step of selecting the wireless access point with the tag information from the plurality of wireless access points according to the attribute information of the wireless access point, the method further comprises:

receiving the attribute information of the wireless access point from the routing device of the wireless access point.

12. The connection establishing method according to claim 9, wherein the attribute information of the wireless access point comprises a name and a physical address of the wireless access point.

13. The connection establishing method according to claim 12, wherein the step of selecting the wireless access point with the tag information from the plurality of wireless access points according to the attribute information of the wireless access points comprise:

determining whether the name and the physical address of the wireless access point match a name and a physical address of a wireless access point in a database; and using the wireless access point as a selected target wireless access point when the name and the physical address of the wireless access point match the name and the physical address of the wireless access point in the database.

14. The connection establishing method according to claim 9, wherein, the request for establishing the connection comprises attribute information of the user equipment; and
the step of returning, to the user equipment based on the request for establishing the connection, the connection control to the target wireless access point comprises:
verifying the attribute information of the user equipment, and returning, to the user equipment according to a verification result, the connection control to the target wireless access point.

15. The connection establishing method according to claim 14, wherein, the step of returning, to the user equipment according to the verification result, the connection control to the target wireless access point comprises:
returning, to the user equipment, a control of establishing the connection to the target wireless access point when the verification result succeeds; or
returning, to the user equipment, a control of a prohibiting establishment of the connection to the target wireless access point when the verification result fails.

16. The connection establishing method according to claim 15, wherein, after or during the step of returning, to the user equipment according to the verification result, the control of establishing the connection to the target wireless access point, the connection establishing method further comprises:
sending, to the user equipment, information of a successful establishment of the connection to the target wireless access point; and
after or during the step of returning, to the user equipment, the control of the prohibiting establishment of the connection to the target wireless access point, the connection establishing method further comprises
sending, to the user equipment, information of an unsuccessful establishment of the connection to the target wireless access point.

17. The connection establishing method according to claim 9, wherein, the request for establishing the connection comprises access authentication information of the target wireless access point; and
the step of returning, to the user equipment based on the request for establishing the connection, the connection control to the target wireless access point comprises:
verifying the access authentication information of the target wireless access point, and returning, to the user equipment according to a verification result, the connection control to the target wireless access point.

18. A connection establishing method at a routing device of a wireless access point, comprising:
sending attribute information of a wireless access point to a network device;
receiving a wireless access point with tag information selected by the network device based on the attribute information from the wireless access point and push information to-be-displayed corresponding to the wireless access point; and
when a user equipment enters a signal range of the routing device of the wireless access point, sending, to the user equipment, the wireless access point with the tag information and the push information to-be-displayed corresponding to the wireless access point;
selecting the wireless access point as a target wireless access point by the user equipment based on the tag information;
obtaining a request for establishing a connection to the target wireless access point selected by the user equipment based on the tag information; and
returning, to the user equipment based on the request for establishing the connection, a connection control to the target wireless access point.

* * * * *